(12) United States Patent
Arrigoni Neri et al.

(10) Patent No.: US 8,991,454 B2
(45) Date of Patent: Mar. 31, 2015

(54) ANTI SLIP DEVICE FOR A WHEEL AND A METHOD FOR MOUNTING THE ANTI SLIP DEVICE

(75) Inventors: Marco Arrigoni Neri, Molteno (IT); Luigi Farina, Molteno (IT); Stefano Necchi, Molteno (IT)

(73) Assignee: Thule Sweden AB, Hillerstorp (SE)

( * ) Notice: Subject to any disclaimer, the term of this patent is extended or adjusted under 35 U.S.C. 154(b) by 0 days.

(21) Appl. No.: 14/009,772

(22) PCT Filed: Feb. 16, 2012

(86) PCT No.: PCT/EP2012/052709
§ 371 (c)(1),
(2), (4) Date: Oct. 3, 2013

(87) PCT Pub. No.: WO2012/110609
PCT Pub. Date: Aug. 23, 2012

(65) Prior Publication Data
US 2014/0053963 A1    Feb. 27, 2014

(30) Foreign Application Priority Data

Feb. 16, 2011 (EP) .................................. 11154659
Oct. 10, 2011 (EP) .................................. 11184536

(51) Int. Cl.
*B60C 11/00* (2006.01)
*B60C 27/06* (2006.01)
*B60C 27/10* (2006.01)

(52) U.S. Cl.
CPC ............... *B60C 27/062* (2013.01); *B60C 27/10* (2013.01)
USPC ...................................... 152/213 R; 152/216

(58) Field of Classification Search
USPC ...................... 152/213 R, 214, 242, 216, 217
See application file for complete search history.

(56) References Cited

U.S. PATENT DOCUMENTS

| 1,462,249 A |   | 7/1923 | Lewis |
| 1,547,524 A | * | 7/1925 | Samovitz .................. 24/68 TT |
| 1,551,602 A |   | 9/1925 | Hellerud |

(Continued)

FOREIGN PATENT DOCUMENTS

| CA | 2217132 A1 | 4/1999 |
| DE | 1939480 A1 | 2/1971 |

(Continued)

OTHER PUBLICATIONS

International Preliminary report on patentability and Written Opinion mailed Aug. 21, 2013, in corresponding PCT patent application No. PCT/EP2012/052709.

(Continued)

*Primary Examiner* — Jason C Smith
(74) *Attorney, Agent, or Firm* — Novak Druve Connolly Bove + Quigg LLP

(57) ABSTRACT

The present invention relates to an anti slip device (10) for a wheel (40) having a first side (40a), a second side (40b) and a tread (41). A securing arrangement (100) is used to secure the anti slip device (10) to the wheel (40). The securing arrangement (100) of the anti slip device (10) comprises a tensioning member (110) adapted to be foot operated by a user between a first position, in which the anti slip device (10) can be removed from the wheel (40), and a second position, in which the anti slip device (10) is substantially secured to the wheel (40). The present invention also relates to a method for operating the anti slip device (10).

19 Claims, 25 Drawing Sheets

(56) References Cited

U.S. PATENT DOCUMENTS

| | | | |
|---|---|---|---|
| 1,606,090 | A | 11/1926 | Masters |
| D263,460 | S | 3/1982 | Leach |
| D320,925 | S | 10/1991 | Barbour et al. |
| 5,572,771 | A | 11/1996 | Kelleghan |
| 5,692,403 | A | 12/1997 | Ling |
| 6,026,876 | A * | 2/2000 | Snyder .......................... 152/218 |
| 6,199,412 | B1 * | 3/2001 | Kennedy ........................... 70/18 |
| 6,213,421 | B1 * | 4/2001 | Franklin .................... 242/384.7 |
| 6,684,667 | B2 | 2/2004 | Young |
| 6,735,826 | B2 | 5/2004 | Uehara et al. |
| D496,881 | S | 10/2004 | Pontaoe |
| 6,868,587 | B2 | 3/2005 | Rard |
| 7,032,415 | B2 | 4/2006 | Young |
| 7,424,813 | B2 | 9/2008 | Wu |
| 7,454,932 | B2 | 11/2008 | Hollier |
| 7,712,497 | B2 * | 5/2010 | Shin .............................. 152/220 |
| D677,537 | S * | 3/2013 | Eriksson et al. ................. D8/44 |
| 2009/0151834 | A1 * | 6/2009 | Bozkurt et al. ........... 152/213 R |
| 2010/0252160 | A1 * | 10/2010 | Gelowicz et al. ......... 152/213 R |
| 2011/0303334 | A1 * | 12/2011 | Safranek ........................ 152/216 |
| 2011/0308682 | A1 * | 12/2011 | Jourdan ........................ 152/216 |
| 2014/0090762 | A1 * | 4/2014 | Fink ........................... 152/213 R |

FOREIGN PATENT DOCUMENTS

| | | |
|---|---|---|
| EP | 0292315 A1 | 11/1988 |
| EP | 2050591 A1 | 4/2009 |
| FR | 2029101 A1 | 10/1970 |
| JP | 60255511 A | 12/1985 |
| WO | 2007030956 A1 | 3/2007 |

OTHER PUBLICATIONS

Thule Easy-Fit CU-9; Downloaded from http://www.thule.com/en-US/US/Products/Snow-Chains/SnowChains/Thule-Easy_-_fit-C . . . on Nov. 29, 2012.

International Search report mailed Apr. 19, 2012, in corresponding PCT patent application No. PCT/EP2012/052709.

Extended European Search Report mailed Apr. 16, 2012, in corresponding European patent application No. 11184536.8.

English abstract for JPS60255511, published on Dec. 17, 1985 and retrieved on Oct. 3, 2013.

English abstract for DE1939480, published on Feb. 18, 1971 and retrieved on Oct. 3, 2013.

English abstract for WO2007030956, published on Mar. 22, 2007 and retrieved on Oct. 3, 2013.

* cited by examiner

ANTI SLIP DEVICE FOR A WHEEL AND A METHOD FOR MOUNTING THE ANTI SLIP DEVICE

CROSS-REFERENCE TO RELATED APPLICATION:

This application is a national phase application of International Application No. PCT/EP2012/052709, which has an international filing date of Feb. 16, 2012, and which is entirely incorporated by reference herein.

TECHNICAL FIELD

The present invention relates to an anti slip device for a wheel and a method for mounting the anti slip device to a wheel. The anti slip device comprises a securing arrangement to secure the anti slip device to the wheel which is easy to use.

BACKGROUND OF THE INVENTION

Snow chains of the prior art are generally mounted to the wheel by positioning the snow chain on the wheel, thereafter turning the wheel by moving the vehicle, and thereafter reposition the snow chains and securing the snow chain to the wheel. The prior art solutions have been improved by introducing a different concept in which the snow chains are mounted automatically. Automatic mounting is generally implemented by the use of spring members and tensioning systems which can be preloaded with a tension force.

After the snow chain has been mounted to the wheel, the vehicle is moved a short distance and as the wheel turns, the spring which has been loaded in the tensioning system automatically tensions and secures the connection arrangement used on the snow chain. One such system is disclosed in EP 0,438,999 A1. The snow chain disclosed in EP 0,438,999 A1 utilizes a rigid ring with a pivotally connected shackle which is connected to two springs. The springs are in turn arranged to a chain which extends across the tread of the wheel to the connection arrangement of the opposite side of the wheel.

The snow chains of the prior art are distinguished by that they require a high amount of hand force when pre loading the tensioning system.

SUMMARY

It is an object of the present invention to provide for an anti slip device which is easy to use and easy to mount and secure to a wheel. The object is at least partly met by an anti slip device for a wheel. The wheel has a first side, a second side and a tread. The anti slip device comprises at least one anti slip member adapted to provide the tread of the wheel with an anti slip surface. The anti slip device further comprises a securing arrangement for securing the anti slip device to the wheel. The securing arrangement of the anti slip device comprises a tensioning member adapted to be operated by a user between a first position, in which the anti slip device can be removed from the wheel, and a second position, in which the anti slip device is substantially secured to the wheel. The tensioning member is adapted to be foot operated by the user.

The present invention provides for an anti slip device which after being mounted, easily can be secured to the wheel of the vehicle.

According to an aspect of the invention, the securing arrangement comprises a housing. The tensioning member is adapted to be displaced with respect to the housing between the first and second position.

According to an aspect of the invention, the anti slip device is adapted to fit a wheel having a first diameter, and the housing has a first length, wherein the first length of the housing is at least 80% of the first diameter of the wheel.

According to an aspect of the invention, the securing arrangement comprises a lock, preferably a snap lock, adapted to lock the tensioning member in the second position.

According to an aspect of the invention, the housing is an elongated housing having a longitudinal axis, and the tensioning member is adapted to be displaced substantially parallel with the longitudinal axis of the elongated housing.

According to an aspect of the invention, the housing, preferably the elongated housing is adapted to cooperate with a part of the wheel, preferably parts of the rim of the wheel, or parts of the tyre, when the tensioning member is displaced from the first position to the second position.

According to an aspect of the invention, the tensioning member comprises a foot pad, preferably a pivotable foot pad.

According to an aspect of the invention, the tensioning member comprises a first and a second section, the first section is arranged inside of the housing and arranged to the retraction member, and the second section is arranged outside of the housing, the second section of the tensioning member comprises the foot pad.

According to an aspect of the invention, the foot pad comprises a slide section adapted to slide on a surface of the housing, and a step surface.

According to an aspect of the invention, the step surface is pivotally arranged with respect to the slide section between an operable position and a transport position.

According to an aspect of the invention, the tensioning member of the securing arrangement is in working cooperation with a flexible elongated member, wherein when the tensioning member is displaced from the first position to the second position, the flexible elongated member is tightened to secure the anti slip device to the wheel.

According to an aspect of the invention, the tensioning member is displaced from the second position to the first position, the flexible elongated member is at least partly relieved from stress thereby permitting removal of the anti slip device from the wheel.

According to an aspect of the invention, the securing arrangement comprises at least one retraction member, such as at least one spring or elastic polymer member, adapted to impart the flexible elongated member with a force component acting to tighten the flexible elongated member when the tensioning member has been displaced to the second position.

According to an aspect of the invention, the securing arrangement comprises a housing and in that the retraction member is arranged inside of the housing.

According to an aspect of the invention, the anti slip device comprises a first connection arrangement adapted to be positioned substantially adjacent the first side of the wheel, a second connection arrangement adapted to be positioned substantially adjacent the second side of the wheel, and in that the at least one anti slip member extends between the first connection arrangement and the a second connection arrangement.

According to an aspect of the invention, the flexible elongated member extends between the first and second connection arrangement and across the tread of the wheel.

According to an aspect of the invention, the first connection arrangement comprises a first portion having a first end and a second portion having a first end, the flexible elongated element extends displaceably between, and past, a first working point on the first portion and a second working point on the second portion, enabling upon tightening of the flexible elongated element the first ends of the first and second portions to be displaced towards each other to a secured position, at which the anti slip device can be secured to the wheel.

According to an aspect of the invention, the first and second portions are arc formed portions.

According to an aspect of the invention, the invention also relates to a method for attaching the anti slip device to a wheel of a vehicle, the method comprises the steps of;

mounting the anti slip device to the wheel;

imparting the tensioning member with a force component using a foot to displace the tensioning member from the first position to the second position.

BRIEF DESCRIPTION OF THE DRAWINGS

Embodiment of the present invention will be described in greater detail with respect to the accompanying drawings in which.

DETAILED DESCRIPTION OF PREFERRED EMBODIMENTS

Figure 1:
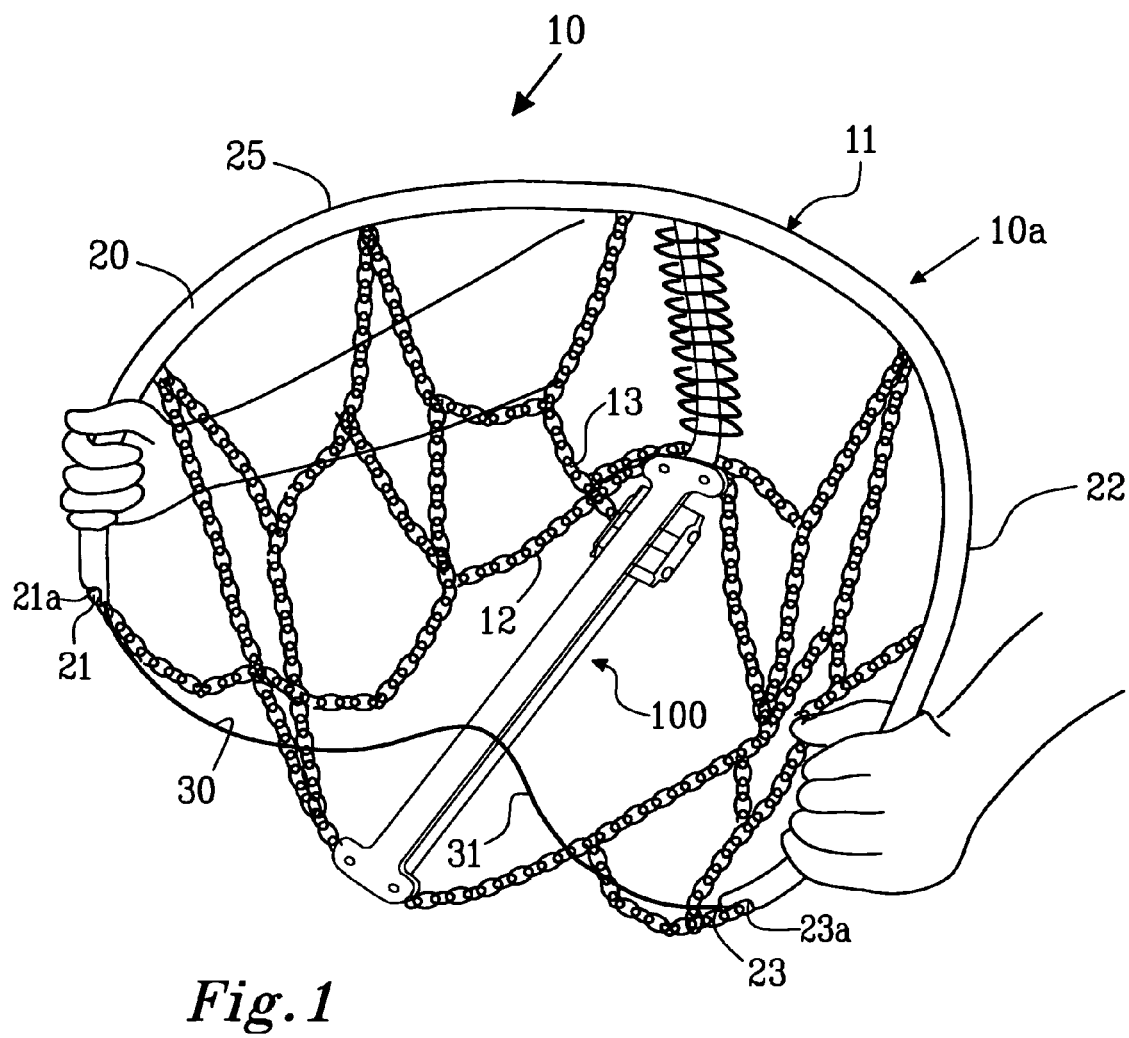
FIG. 1 shows the anti slip device ready to be mounted to a wheel of a vehicle.

FIG. 1 shows an anti slip device 10 for providing a wheel of a vehicle with an anti slip surface and improved anti slip properties. An embodiment of the anti slip device 10 according to the present invention is illustrated as a snow chain 10a which is mounted on a wheel, se FIGS. 2-4 for example, a procedure which will be described in greater detail below. The wheel is referred to as having a first and a second side and a tread there between. The wheel can be arranged on any type of vehicle such as a car, truck or the like. As used herein, the first side of the wheel is generally arranged towards the vehicle and the second side of the wheel is generally arranged facing away from the vehicle.

Turning to FIG. 1, the anti slip device 10 comprises a first connection arrangement 11, adapted to be positioned adjacent, or substantially adjacent, the first side of the wheel. A second connection 12 arrangement is adapted to be positioned adjacent, or substantially adjacent, the second side of the wheel. Between the first and the second connection arrangement is at least one an anti slip member 13 arranged to provide the tread with improved friction properties, enabling an improved friction between the tread and the ground during use of the vehicle.

The anti slip member 13 can be a plurality of chains sections as shown in the illustrated embodiments FIGS. 1-4 for example. The anti slip member could however be a friction increasing cloth or fabric for example. The anti slip member(s) 13 extends between the first connection member 11 and the second connection member 12 across the tread of the wheel.

The anti slip device further comprises a securing arrangement 100 for securing the anti slip device 10 to the wheel. The securing arrangement is adapted to tension or fix parts, or a part, of the securing arrangement 100 to thereby secure the anti slip device 10 to the wheel. In the shown embodiment, this is done by using a flexible elongated element 30. The flexible elongated element 30 can be a chain, a wire, steel wire, steel cord, nylon rope or thread, or the like. Using a steel wire, steel cord, string or the like, i.e. an flexible elongated element having a cross section with a uniform diameter along the whole length, or parts of the lengths, of the flexible elongated element, enables a low clearance with respect to the anti slip members on the thread. It should be noted that the diameter can however differ along the length of the flexible elongated element in some embodiments. This permits the flexible elongated element to cross the tread without exceeding the height of the anti slip members. In the shown embodiment, the anti slip members are chains. In an embodiment, the clearance of the flexible elongated element is lower than the clearance of the anti slip member(s). A low clearance also enables a very slim and snugly fit of the flexible elongated element between the wheel and the ground permitting the securing arrangement to be better tightened as compared to a chain having a similar or higher clearance as the anti slip members.

In the shown embodiment, the flexible elongated element 30 is a steel wire which is arranged in working cooperation with a tensioning device of the securing arrangement 100. The flexible elongated element 30 comprises a first and a second end 30a, 30b, (not shown in FIG. 1).

The first connection member comprises 11 comprises a first arc formed portion 20 having a first end 21 and a second arc formed portion 22 having a first end 23. In the shown embodiment, the first arc formed portion 20 is integrally formed with the second arc formed portion 22. The arc formed portions 20, 22 have their own structural integrity, thus they retain their arc form without any external influences or manipulation. While at the same time, they can be flexible enough to permit the first arc formed portion to be partly displaced with respect to the second arc formed portion, for example by means of a hinge connection of by means of the flexibility of the material itself.

As seen in FIG. 1, the flexible elongated element 30 extends displaceably between the first end 21 of the first arc formed portion 20 and the first end 23 of the second arc formed portion 22. In the shown embodiment, the first ends 21, 23 of the first and the second arc formed portions are functioning as working points 21a, 23a for the flexible elongated element 30. The flexible elongated element is displaceable, it floats freely, while at the same time cooperates with these points during attaching the anti slip device 10 to the wheel 40 so as to displace the first and second ends 21, 23 towards each other. As will be described in greater detail below, the flexible elongated element 30 runs substantially adjacent the first and second arc formed portions 20, 22, thus enabling upon tightening of the flexible elongated element 30 the first ends 21, 23 of the arc formed portions 20, 22 to be displaced towards each other to secure the anti slip 10 device to the wheel.

The second connection member 12 is in the shown embodiment in FIG. 1 formed by a chain which have a circular form. The second connection member 12, in the form a chain, thus has a substantially circular form, after it has been positioned on the wheel. It should be noticed that the second connection member 12 does not have the integrity to retain the circular form if positioned on the ground for example, as compared to the arc formed portions 20, 22 of the first connection member 11. However, also the second connection member could be a ring like member having structural integrity.

The first connection member 11 could in an embodiment be formed by parts of the anti slip members. The anti slip members can for example be rigid members and formed with a hook like portion, adapted to retain the anti slip surface to the first side of the wheel in a grip-like manner.

Figure 2:
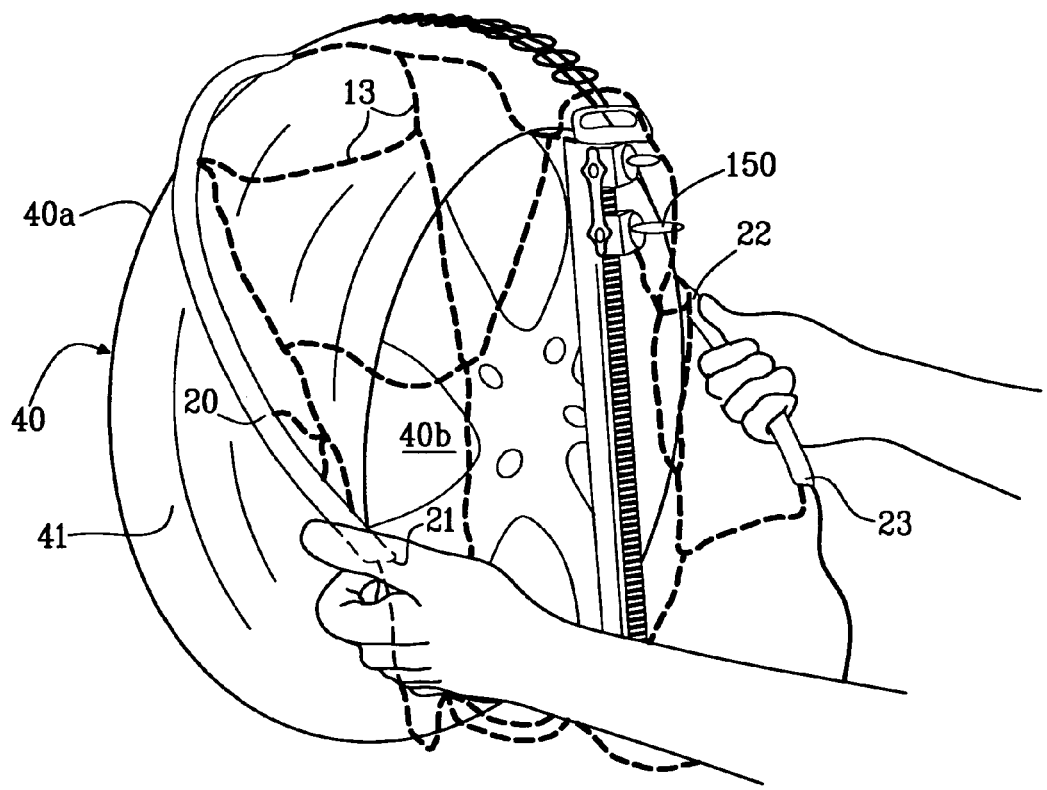
FIG. 2 shows the anti slip device when being mounted to the wheel.
Figure 3:
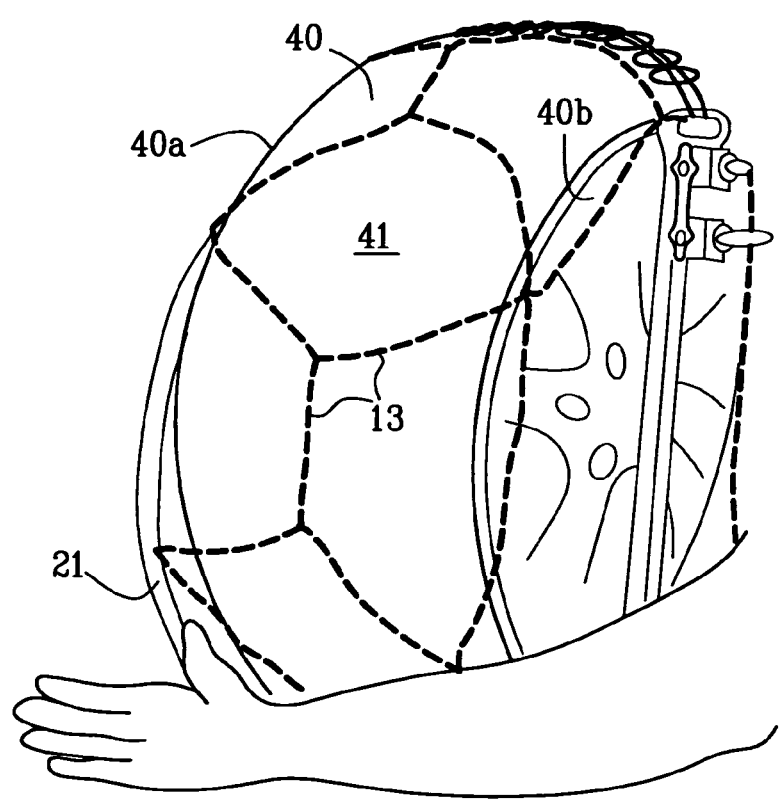
FIG. 3 shows the anti slip device when being mounted to the wheel.
Figure 4:
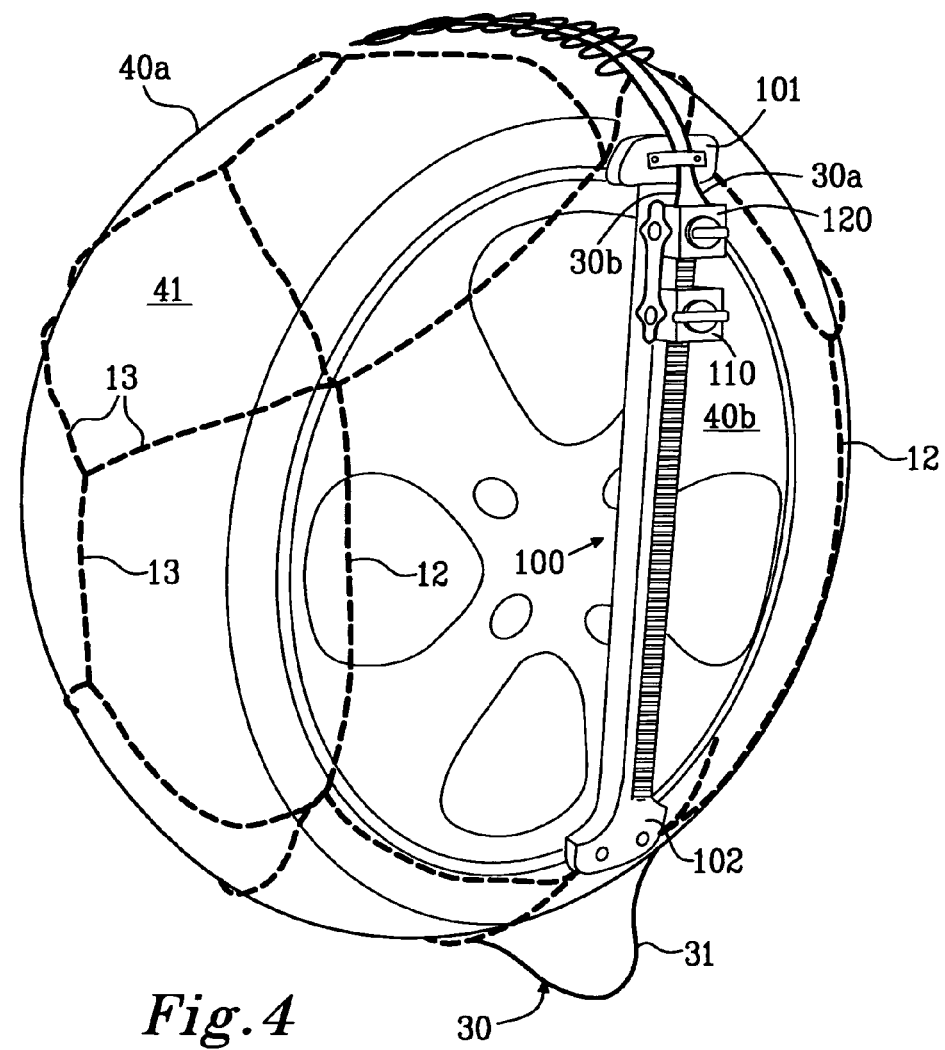
FIG. 4 shows the anti slip device after being mounted to the wheel before the securing arrangement has been operated to secure the anti slip device to the wheel.

FIGS. 2-4 show how an embodiment of the anti slip device 10 according to the present invention can be mounted to a wheel 40. The wheel comprises a first and a second side 40a, 40b, and a tread 41. The user (not fully shown) is facing towards the second side 40b of the wheel 40, while the first side 40a of the wheel is facing the vehicle (not shown). A user grips the first and the second arc formed portions 20, 22, as illustrated by a first and a second arm and puts the anti slip members 13, in the form of a plurality of chains, onto the tread 41 of the wheel 40. The first ends 21, 23 of the first and the second arc formed portions 20, 22 are thereafter inserted or moved to the back of the wheel, i.e. the to the first side 40a of the wheel 40, as shown in FIG. 3, whereafter the user can let go of the first and the second arc formed portions 20, 22. The first and the second arc formed portions 20, 22 can thereafter, if the first and the second arc formed portions 20, 22 are integrally formed or formed by a first and a second portion connected together, flex into the proper position, thus return to their initial relaxed form, supported by their own structural integrity. FIG. 4 shows the anti slip device after the first and the second arc formed portions has relaxed. The first and the second arc formed portions 20, 22 are thus adapted to be positioned on either side of an axle of the vehicle on which the wheel is attached to, i.e. on either side of the axis of rotation of the wheel. As such they are arranged opposite of each other when the anti slip device 10 is mounted on a wheel.

When the first and the second arc formed portions are positioned at the first side 40a of the wheel 40, the flexible elongated element 30, in this case in the form of the steel wire 31, needs to be tightened. This is done by means of the securing arrangement 100. The securing arrangement 100 is adapted to tighten the flexible elongated element 30 so that the first ends 21, 23 of the arc formed portions 20, 22 are displaced towards each other, thereby tightening, or pulling, the anti slip members 13 properly across the tread around substantially the whole periphery of the wheel 40. That part of the wheel 40 which is facing towards the ground is of course excluded due to the weight of the vehicle. However, the flexible elongated element 30 can be readily tightened around the surface of the tread which faces the ground. The flexible elongated element 30 is thus pre loaded with a force which acts to tighten the flexible elongated element 30 when the wheel is turned.

The flexible elongated element 30 extends across the tread 41 of the wheel 40 so that to first and the second ends 30a, 30b are both arranged to the securing device 100. The flexible elongated element 30 thus runs from the second side 40b of the wheel 40, across the tread 41 to the first side 40a of the wheel 40, back across the tread 41 to the second side 40b of the wheel 40. The flexible elongated element 30 thus extends continuously at the first side 40a of the wheel 40, without any end present at the first side 40a of the wheel 40. As both the first and the second ends 30a, 30b of the flexible elongated element 30 are arranged to the securing arrangement 100, the flexible elongated element 30 can be tightened and stretched far enough to secure the anti slip device 10 to the wheel 40, using a short tightening length, as will be described below. FIG. 8 shows the first side 40a of the wheel 40 after the flexible elongated element 30 has been tightened.

It is of course possible that the flexible elongated member is arranged in other configurations than described above, the important thing is that the anti slip device is secured to the wheel when tightening the flexible elongated member. The flexible elongated member could comprise a first ring formed section having a single string attached to the first ring formed section for example. In this embodiment, only one end of a flexible elongated member extends across the tread of the wheel.

As is noticed, the securing arrangement 100 has a substantially elongated form defined by an elongated base member 103 having a first and a second end 101, 102. A first and a second tensioning member 110, 120 are displaceably arranged on the elongated base member 103 of the securing arrangement 100. The elongated base member 103 extends between points or sections of the periphery of the second connection arrangement 12, substantially as a diameter of a circle.

In an embodiment, the base member is arranged inside of a housing, such as a housing 200 disclosed herein. The housing can protect the mechanism from dirt, snow or other environmental factors.

The first and the second tensioning members 110, 120 each comprises a lock mechanism 111, 121 which can be operated to lock the positions of the first and the second tensioning members 110, 120 from displacement along the elongated base member 103 respectively. The lock mechanisms 111, 121 are adapted to be in working cooperation with a ratched surface 104 of the elongated base member 103, which extends in the longitudinal direction of the elongated base member 103. However, using a spring actuated ratch member, cooperating with the ratched surface 104 of the elongated base member 103, the first and the second tensioning members 110, 120 can be displaced in a direction towards the second end 102 of the elongated base member 103, while being prevented from being displaced in a direction towards the first end 101 of the elongated base member 103. Hence, according to an embodiment, the first and the second tensioning members 110, 120 and the elongated base member 103, comprises lock means enabling them to be displaced in a direction towards the second end 102 of the elongated base member 103, while being prevented from being displaced in a direction towards the first end 101 of the elongated base member 103. The lock mechanisms 111, 121 can further be operated to unlock the first and the second tensioning member 110, 120 enabling displacement in any direction in the longitudinal direction of the elongated base member.

The base member 103 can in an embodiment function solely as a support member to support at least the first tensioning member 110 during displacement so that the first tensioning member is not misaligned or pinched. In an embodiment, the housing is used as a support member so that the first tensioning member, and optionally the second tensioning member, can run freely inside of the housing. There can thus be embodiments having both a base member 103 as described herein and a housing 200, or just a housing 200 without the base member 103, as will be described below.

According to an aspect, the tensioning member 110 is supported by a self retaining element, or rigid element, such as the base member 103 or the housing 200, when being displaced between the first and the second position.

At least one retraction member 130 is arranged between the first and the second tensioning members 110, 120. At least one retraction member 130 is arranged between the first tensioning member and the flexible elongated member 30. In the shown embodiment, the retraction member 130 is formed by an elastic rubber-like member, which can be elongated and thereafter retracted. A spring or a similar device could also be used.

Figure 7:
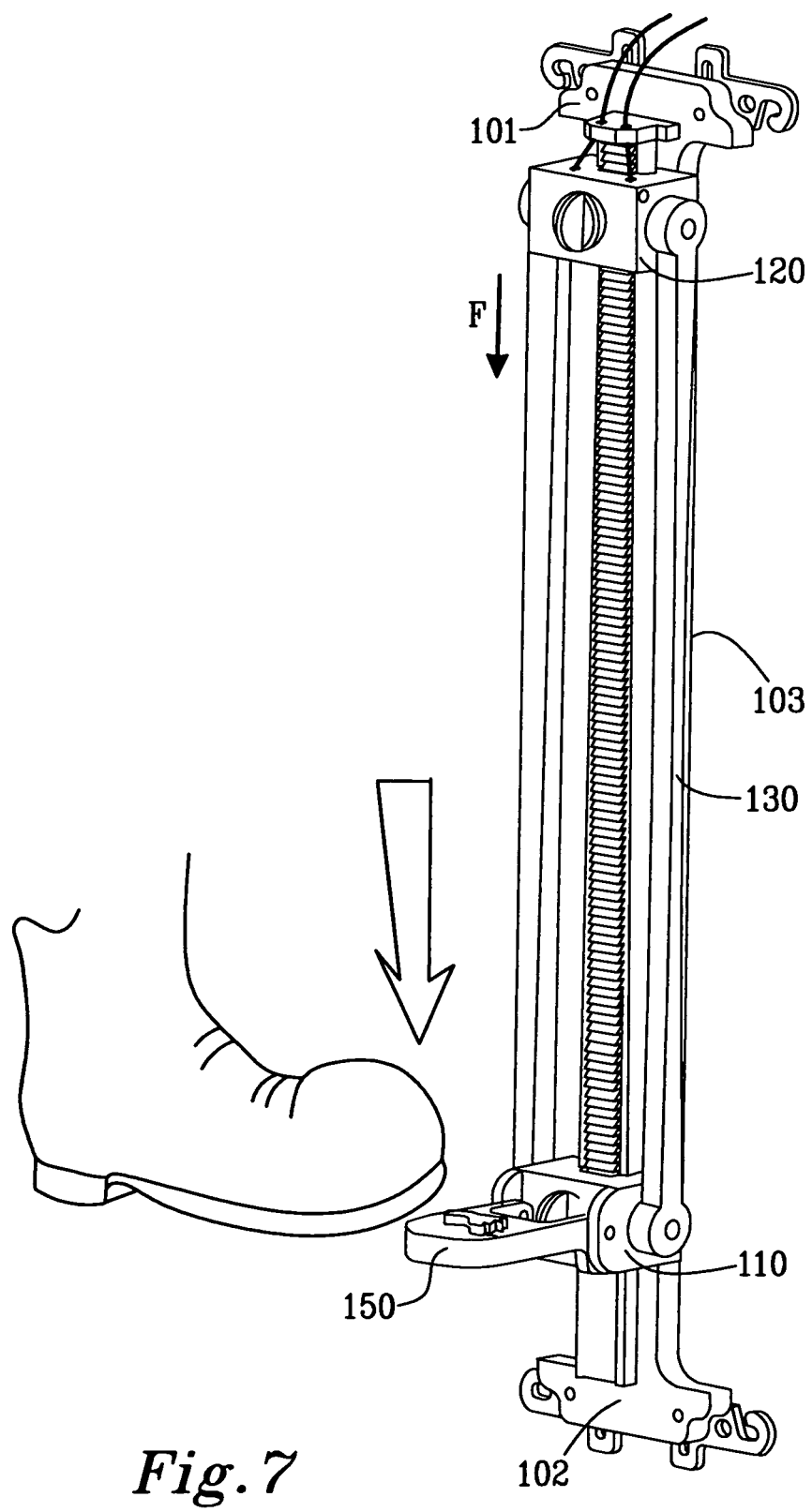
FIG. 7 shows a user stepping on the foot pad to load the retraction member.

In FIG. 7, the first tensioning member 110 has been displaced in the longitudinal direction of the elongated base member 103 towards the second end 102 of the elongated base member 103, whereupon the retraction member 130, in this case in the form of two elastic rubber-like members 131, 132, is tensioned. The first tensioning member 110 has thus been displaced towards a position substantially opposite to the position at which the first and the second ends 30a, 30b crosses the tread 41 of the wheel 40, thus readily away from that position. The first and the second ends 30a, 30b of the flexible elongated element 30 are as a consequence strained by the retraction member 130 as the retraction member 130 is trying to retain its original state, or relaxed state, by retracting itself. A force component, illustrated by the arrow F, is imparted to the second tensioning member 120, and the flexible elongated element 30. The first tensioning member 110 can be locked in the tensioned position using the lock mechanism 111, or by a snap lock for example.

The second tensioning member 120, and thus the first and the second ends 30a, 30b of the flexible elongated element 30 will, upon rotating the wheel, be permitted to be retracted towards the first tensioning member 110 by means of the retraction member 130. The anti slip device 10 is thus automatically secured to the wheel 40 when the wheel 40 turns and the flexible elongated element 30 is permitted to be fully retracted across the tread 41 of the wheel 40 as a consequence of the displacement of the second tensioning member 120.

The first and the second arc formed portions 20, 22 can be formed by an open ring member 25 as described in greater detail in European patent application no 11154659.4, Thule Sweden AB, herein incorporated as reference. The European patent application no 11154659.4, Thule Sweden AB, also disclose in greater detail how the anti slip device can be mounted and dismounted. The open ring member can be manufactured from a bendable but substantially, or to a degree fully, self retaining material such as spring steel. A sheath component, or tube component, comprises the form of an open ring member and sheaths the flexible elongated element 30 and the open ring member. The sheath component can be rigid or soft however, while being strong enough for a proper attachment of the anti slip device and the forces such anti slip device can be subjected to. The anti slip members 13 are connected to the open ring member 25, which forms a part of the first connection arrangement 11 in the shown embodiment. The flexible elongated element 30 could however be attached to the open ring member 25 using individual rings or the like or as a continuous sheet member.

To remove the anti slip device, the lock mechanism, e.g. the lock mechanisms 111, 121 are operated to unlock the first and the second tensioning device 110, 120, whereafter one of the arc formed portions 22, can be pulled to loosen the anti slip members 13 from the tread 41 of the wheel 40. The anti slip device 10 can thereafter simply be removed from the wheel 40. In cases were only one lock mechanism is present, such as the embodiment shown in FIGS. 8a-12, the lock is unlocked by e.g. pressing release buttons 300 in a direction shown in FIG. 8a.

Figure 5:
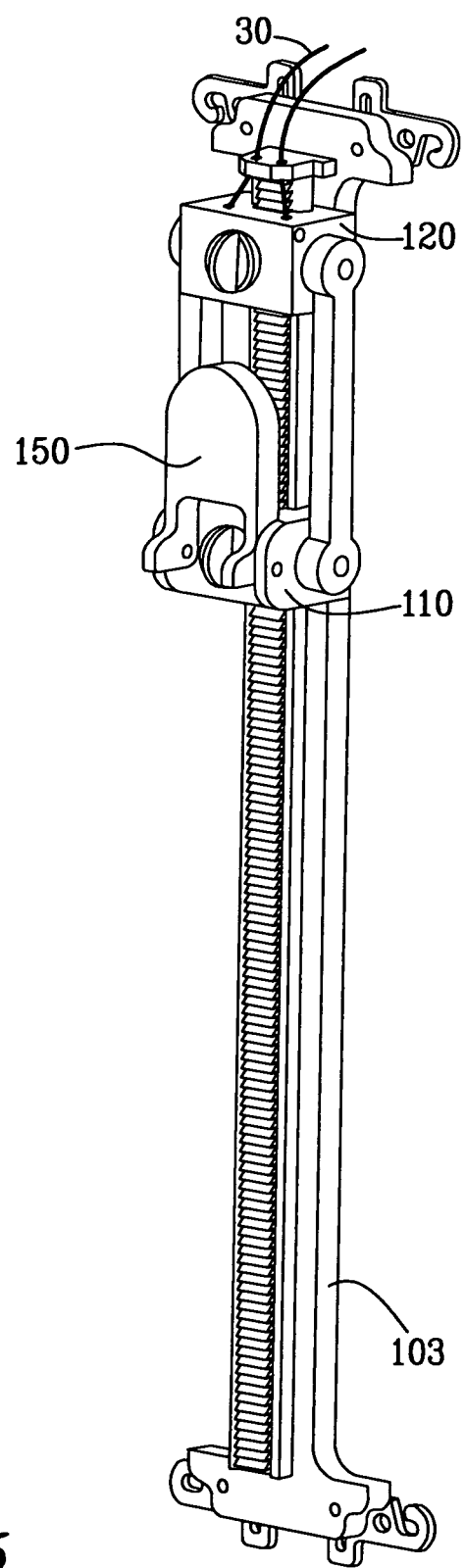
FIG. 5 shows parts of the anti slip device and the base member supporting the tensioning member during displacement to load the retraction member with a load.
Figure 6:
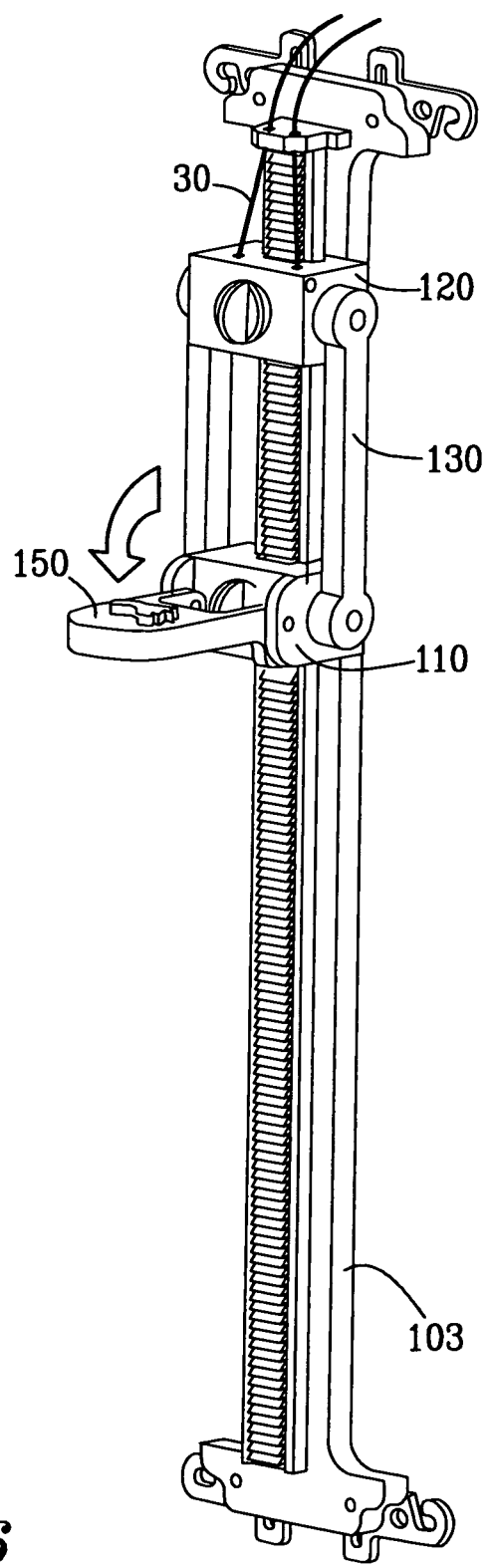
FIG. 6 shows parts of the anti slip device and the a base member, the foot pad of the tensioning member is positioned in an operable position, permitting a user to step on the foot pad to load the retraction member.
Figure 10:
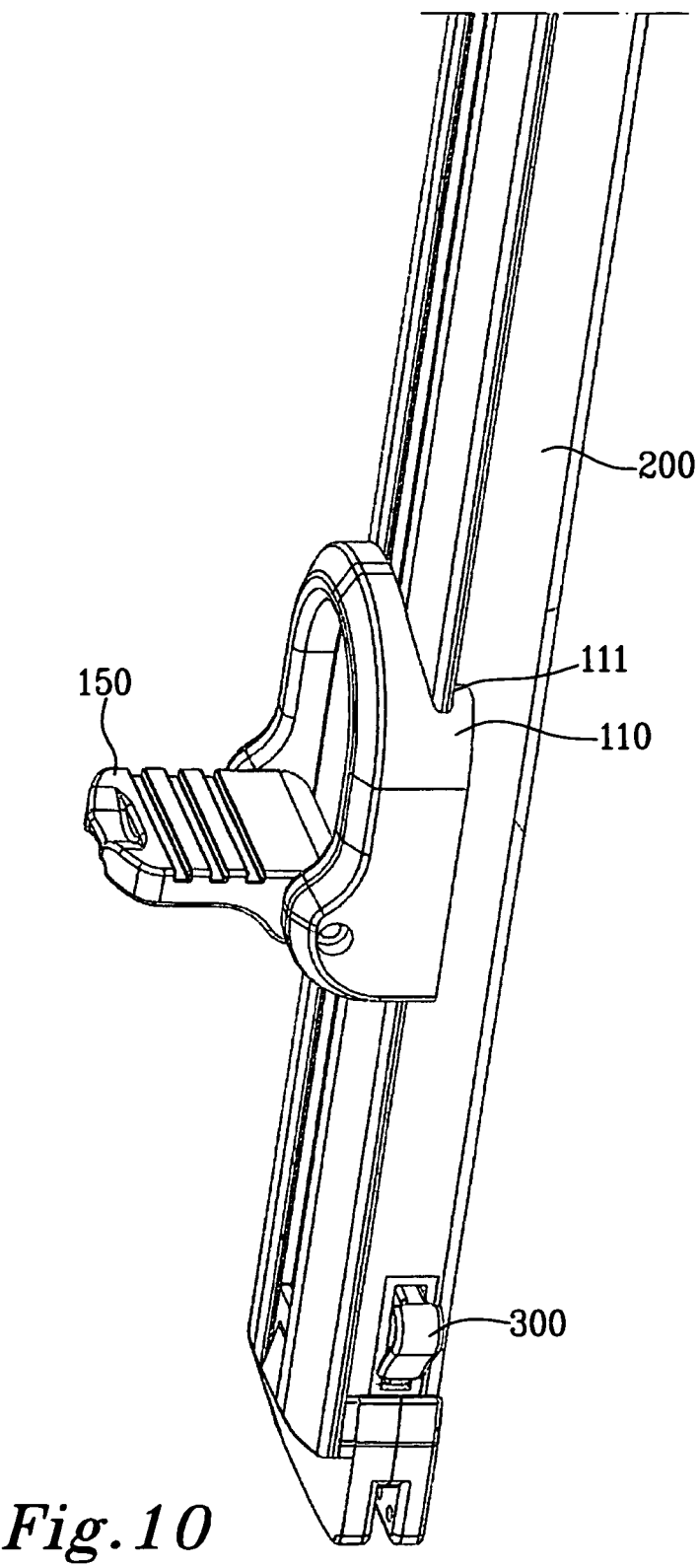
Figure 11:
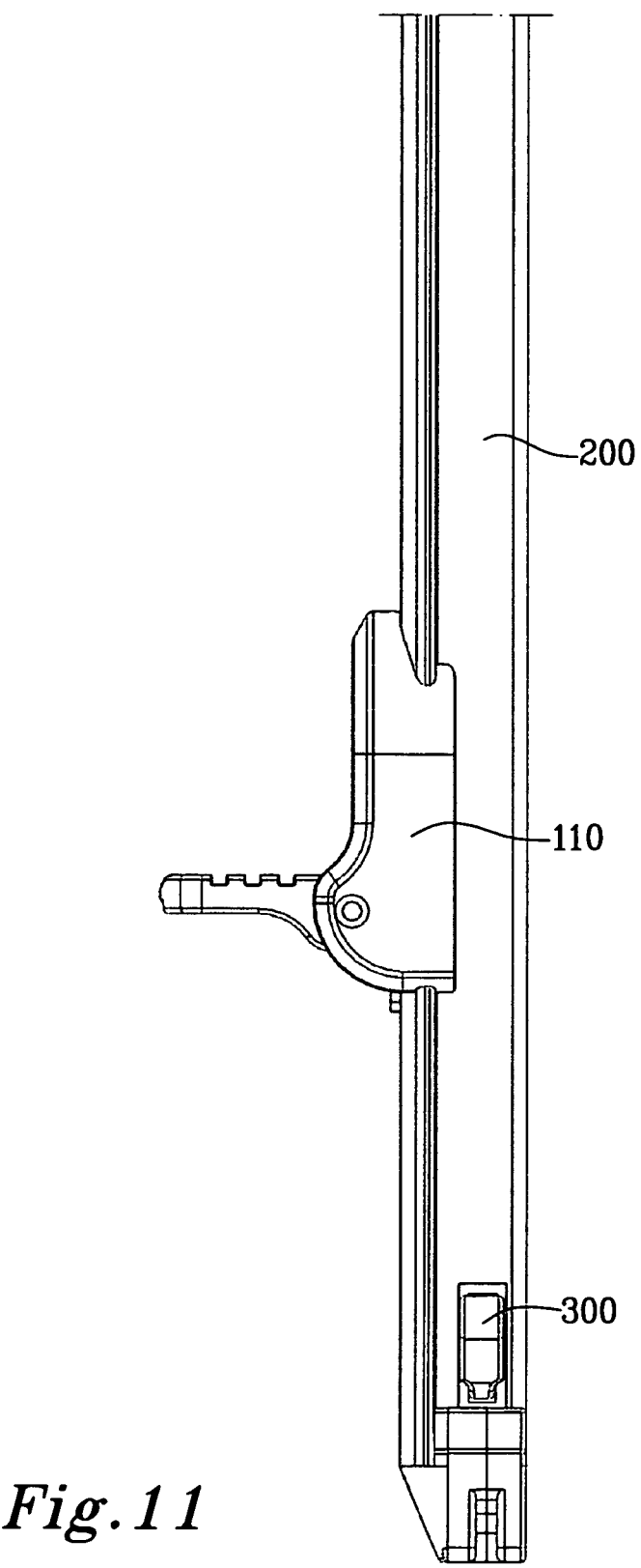

As shown in FIGS. 5-7, the first tensioning member 110 can be provided with a foot pad, for enabling the first tensioning member 110 to be foot operated. The anti slip device 10, according to an embodiment of the present invention can thus be foot operated. The first tensioning member 110 can be provided with a foot pad 150, preferably a pivotably foot pad. To displace the first tensioning member 110, and thereby to impart the second tensioning member 120 with a force component, the foot pad 150 can be positioned in an operable position, as shown in FIGS. 6 and 10-11. In the operable position, the foot pad is substantially perpendicular to the elongated base member 103 and/or the housing 200. As is illustrated by the arrow in FIG. 7, the first tensioning member 120 can be displaced by a users foot towards the second end 102 of the elongated base member 103, which is towards a position substantially opposite to the position at which the first and the second ends 30a, 30b crosses the tread 41 of the wheel, thus readily away from that position. As is noticed, the retraction member 130 is stretched and thus imposes a force component to the second tensioning member 120 to pull the first and the second ends 30a, 30b of the flexible elongated element 30. As the wheel is turned, the second tensioning member 120 will be retracted towards the first tensioning member 110 and the anti slip device 10 will be secured to the wheel 40. The second tensioning member 120 can function as a coupling member between the retraction member and the flexible elongated member.

It is possible that the elongated flexible member 30 is arranged directly to the retraction member 130, in such case, there is no need for a second tensioning member, such as the second tensioning member 120. A second tensioning member can be advantageous however, especially when a housing 200 is used as it prevents the retraction member from being misaligned. The second tensioning member can thus function as a guiding member to parts of the retraction member and/or to parts of the flexible elongated member.

Figure 8A:
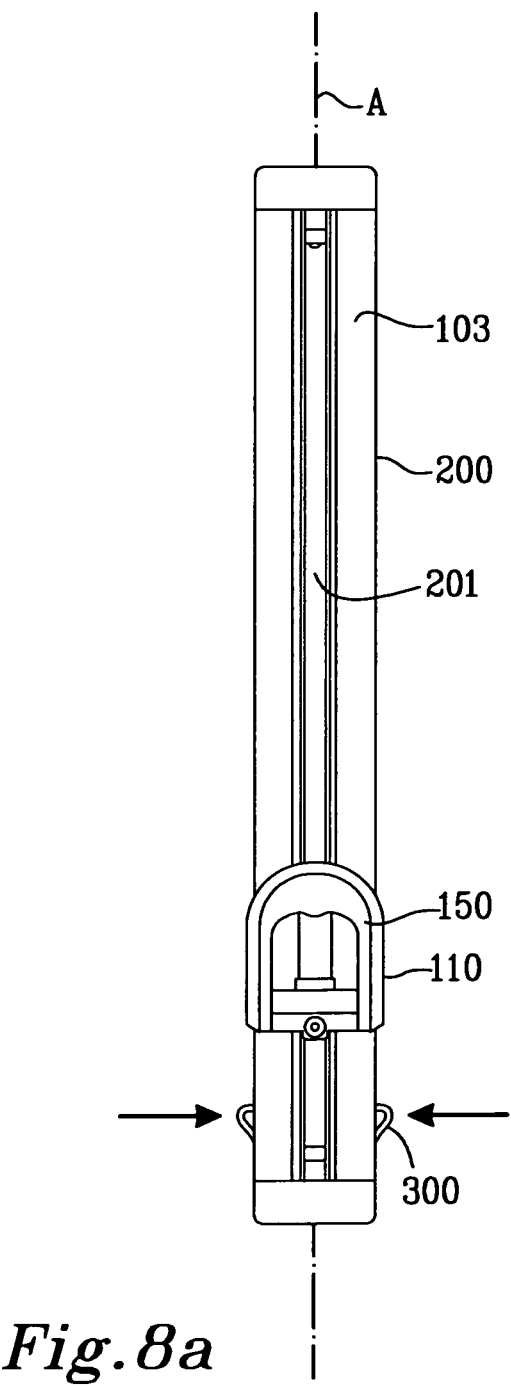
FIG. 8a shows a second embodiment of the anti slip device having housing to cover the retraction member with a view towards the front side of the housing.
Figure 8B:
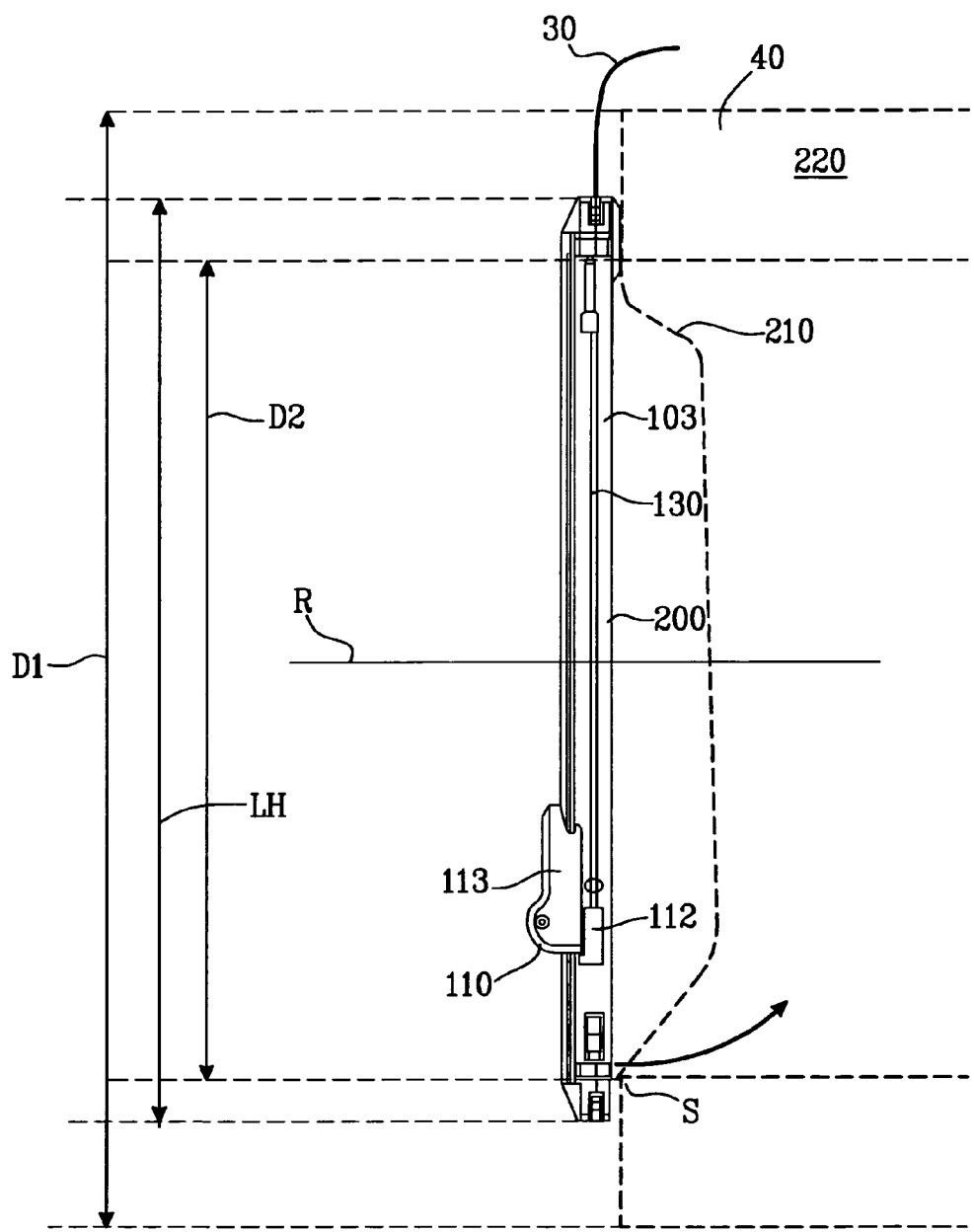
FIG. 8b shows the housing from FIG. 8a view towards the side of the housing.

FIGS. 8a-8b shows an embodiment which comprises a foot operated tensioning member, a retraction member and a housing 200. It should be noted that the housing 200 could function as a base member to the retraction member 130 by itself, or optionally encompass a base member 103 as disclosed with respect to FIGS. 5-7 for example. The housing comprises an elongated form and is adapted to cover the retraction member 130 from exposure to dirt, snow or other foreign material which could damage the mechanism of the securing arrangement. The anti slip device 10 thus comprises a securing arrangement at least partly encompassed by a housing 200. FIG. 8a shows parts of the securing arrangement 100 with a view towards the front side of the housing 200 while FIG. 8b shows parts of securing arrangement 100 with a view towards the side of the housing 200. The wheel is schematically indicated with dashed lines in FIGS. 8a-8b.

The housing 200 comprises a slot 201 in the form of a through aperture into the interior of the housing 200. The slot 201 extends substantially long the full length of the housing 200, or at least along 70% of the length of the housing. A tensioning member, in this case similar to the first tensioning member 110 extends from the interior of the housing 200 through the slot 201.

The first tensioning member 110 comprises a first section 110a arranged inside of the housing 200 and a second section 110b arranged outside of the housing 200. The first section 110a, which is arranged outside of the housing 200, comprises a foot pad 150, which preferably is pivotable about a pivot axis, in this case an axle in the form of a bolt. The food pad 150 can thus be displaced between an operable position, as shown in FIGS. 7 and 10-11, and a transport position as shown in FIG. 8b for example.

As seen in FIG. 8b, the wheel has a diameter D1. The wheel has a rim 210 and a tyre 220. The diameter D2 of the rim 210 is as noticed slightly smaller than the length LH of the housing 200, while the diameter D1 of the wheel, i.e. the rim 210 including the tyre 20, is slightly larger than the length LH of the housing 200. When a user operates the foot pad, at least from the first position, shown in FIG. 6, to the second position, shown in FIG. 7, to load the retraction member, the housing 200 will rest on a surface S of the tyre 220. The surface S of the tyre will thus counteract any rotational motion which a user could impart to the housing 200 when pressing the foot pad to towards the second position. Such rotational motion has been indicated in FIG. 8b with an arrow. In FIG. 8n the housing 200 is partly transparent to visualise the interior of the housing 200. Parts of the retraction member 130 and the flexible elongated element 30 have also been illustrated in FIG. 8b.

The tensioning member 110 comprises a first and a second section 112, 113, the first section 112 is arranged inside of the housing 200 and coupled to the retraction member 130. The second section 113 is arranged outside of the housing 200 and comprises the pivotable foot pad 150. The tensioning member 110 thus comprises a first interior section and a second exterior section with respect to the housing 200. The first section 112 of the tensioning member 110 is arranged with lock means to enable the tensioning member 110 to be locked, preferably with a snap lock, at the second position. In a corresponding manner at one end of the housing 200, in the proximity of the second position of the tensioning member 110, the housing is provided with means to lock the tensioning member 110 at the second position. A user can simply press the foot pad 150 to displace the foot pad to the second position and thereby load the retraction member 130. After relieving the foot pad of pressure, the tensioning member 110 will remain in the second position by means of the snap lock.

Figure 9:
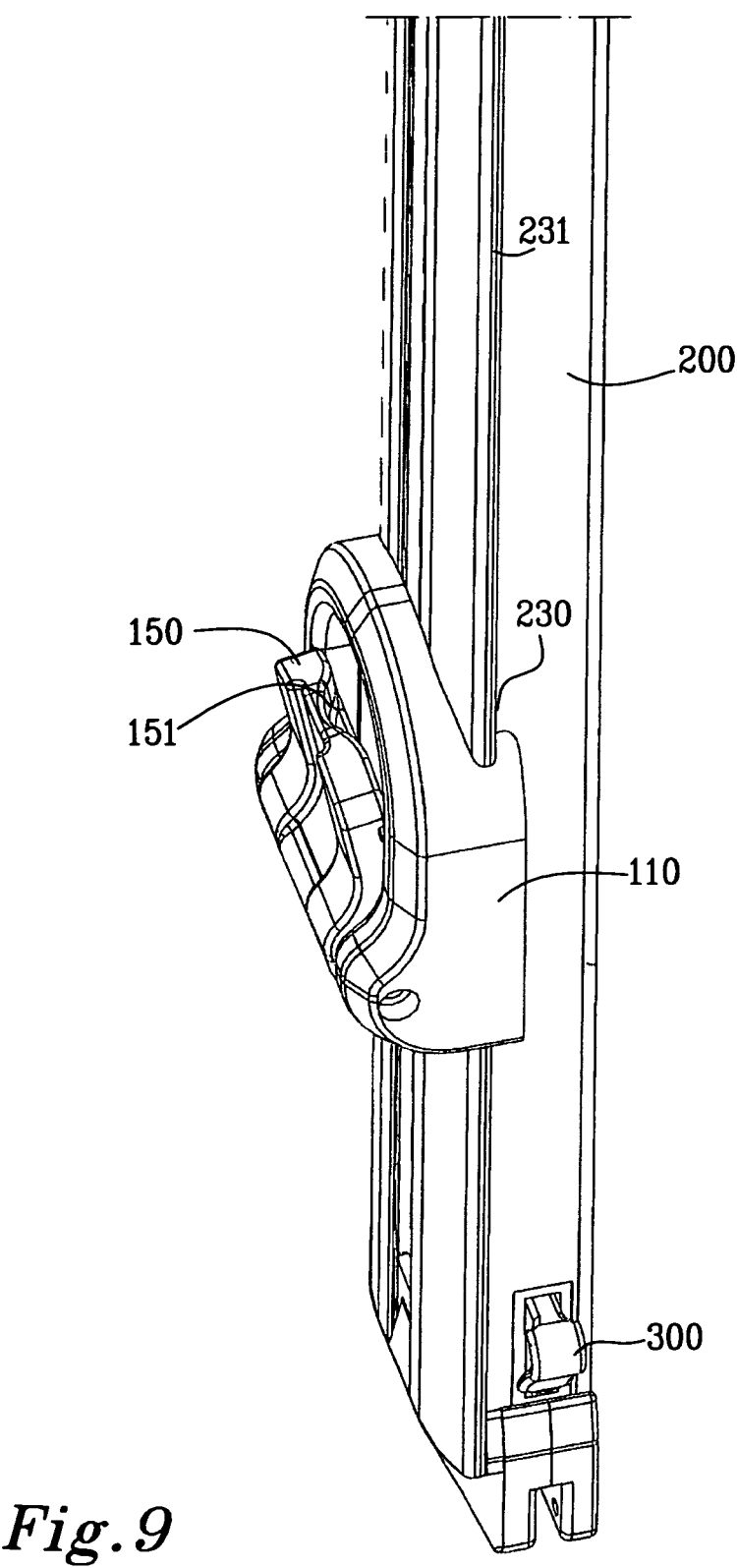
FIGS. 9-11 show parts of the housing from FIG. 8a in greater detail, the foot pad being in the operable position.

FIG. 9 shows the tensioning member 110 and parts of the housing 200 in greater detail. As is noticed, the pivotable foot pad 150 comprises a cut out 151, i.e. means for displace the foot pad 150 between the operable position and the transport position, thus enabling a user to pull out the pivotable foot pad to the operable position, as shown in FIG. 10 for example. The foot pad 150 can be biased by e.g. a spring to the transport position The tensioning member 110 has at least one slide section, or slide surface, which is adapted to slide on a corresponding surface of the housing 200. The housing 200 of the anti slip device is thus adapted to have at least one guiding slide surface 230. The guiding slide surface 230 is formed by a flange 231 to which parts of the tensioning member 110 can cooperate with, but could in other embodiments be formed by a slot, ridge, groove or the like. In the shown embodiment, the second section 113 of the tensioning member 110 comprises the slide surface which is arranged in working cooperation with the guiding slide surface 230 of the housing 200. It should be noted that the first section could be provided with a slide surface to support a slide surface of the second section, or as an alternative to a slide surface of the second section of the tensioning member.

The housing 200 further comprises at least one opening through which at least parts of the flexible elongated member 30 can extend. Optionally, any member arranged to cooperate with the retraction member 130 and the flexible elongated member 30 could extend through the opening.

Figure 12A:
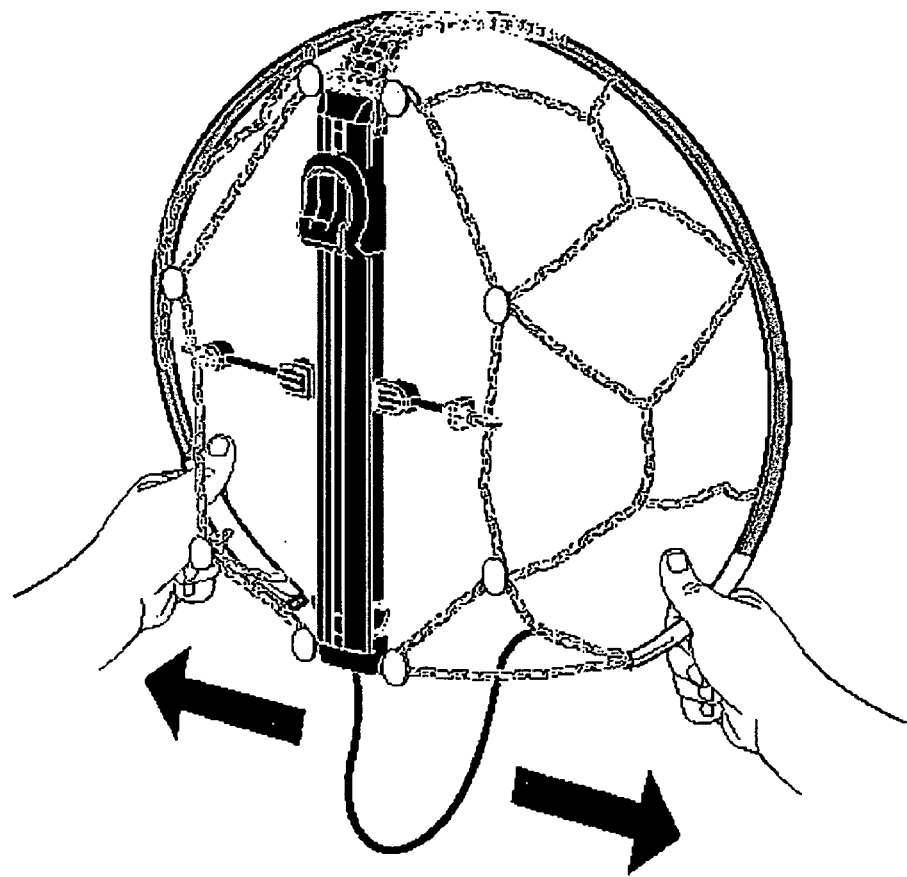
FIG. 12 shows the mounting, or fitting, and the removal of the anti slip device.
Figure 12B:
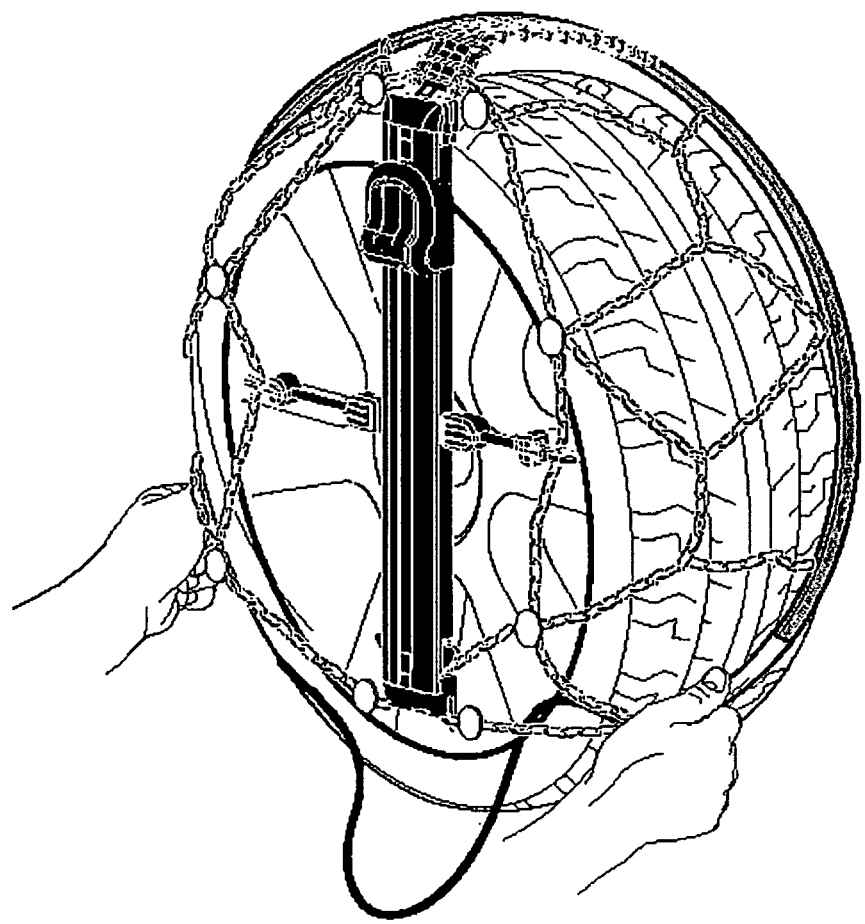
Figure 12C:
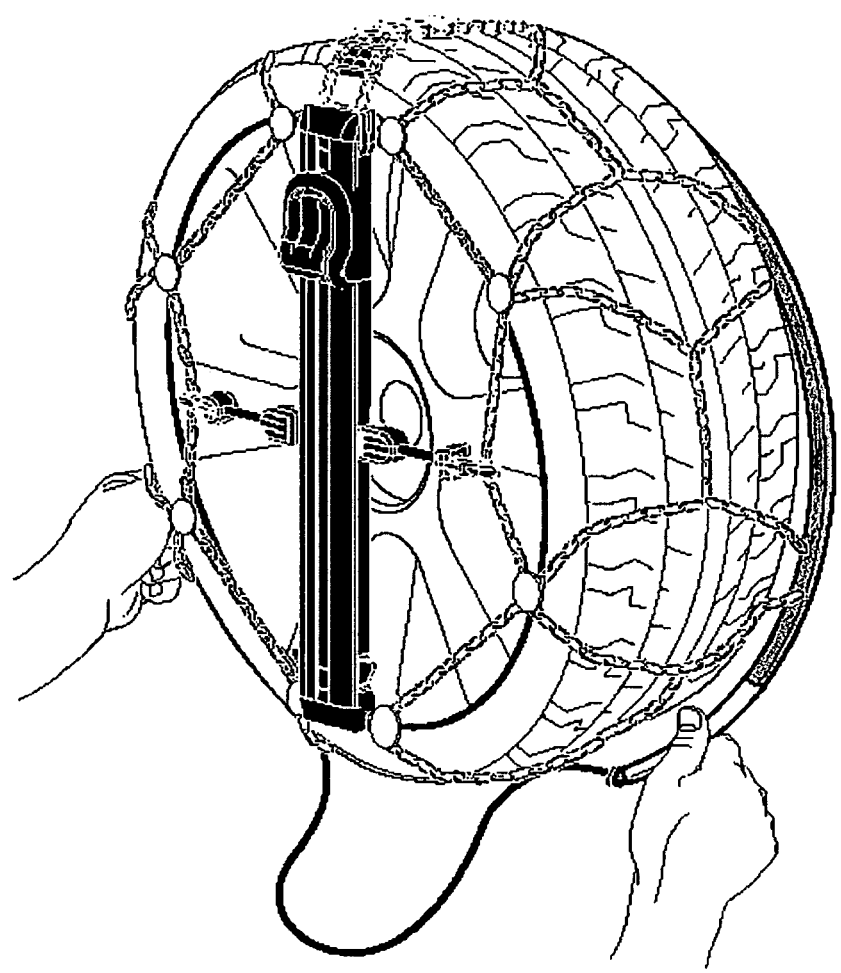
Figure 12D:
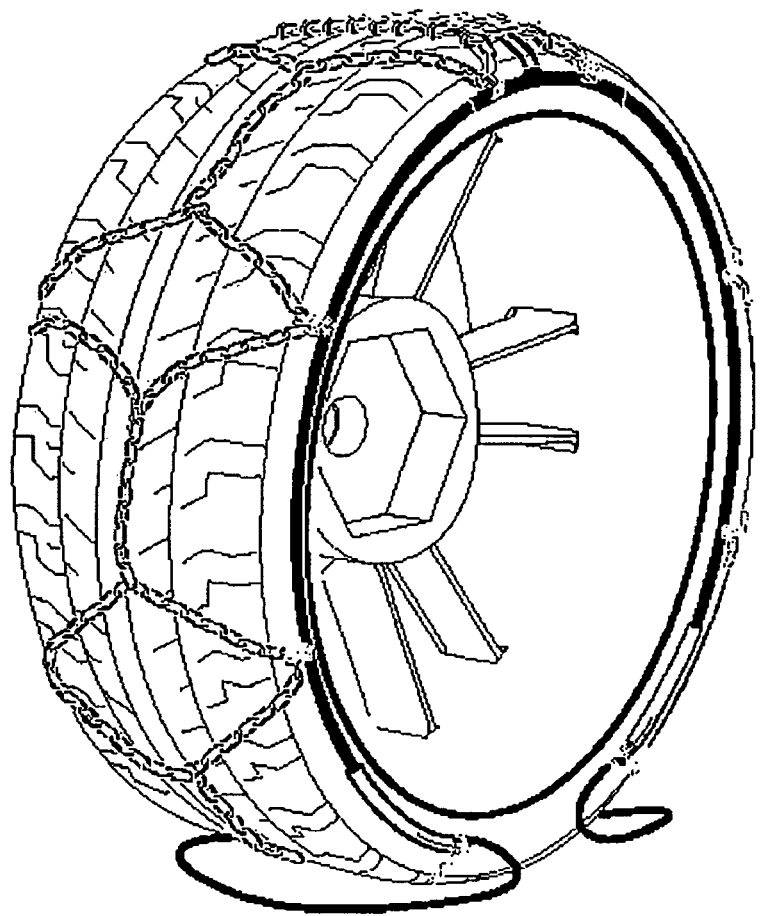
Figure 12E:
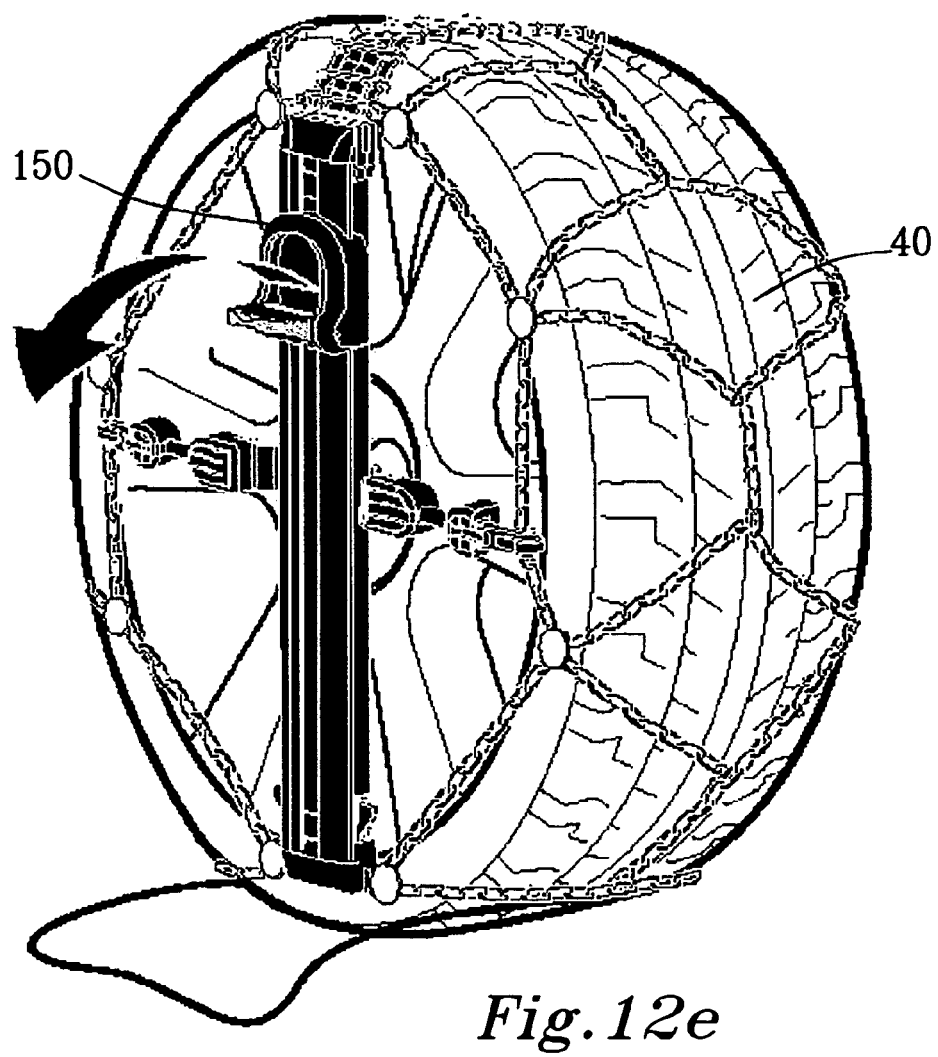
Figure 12F:
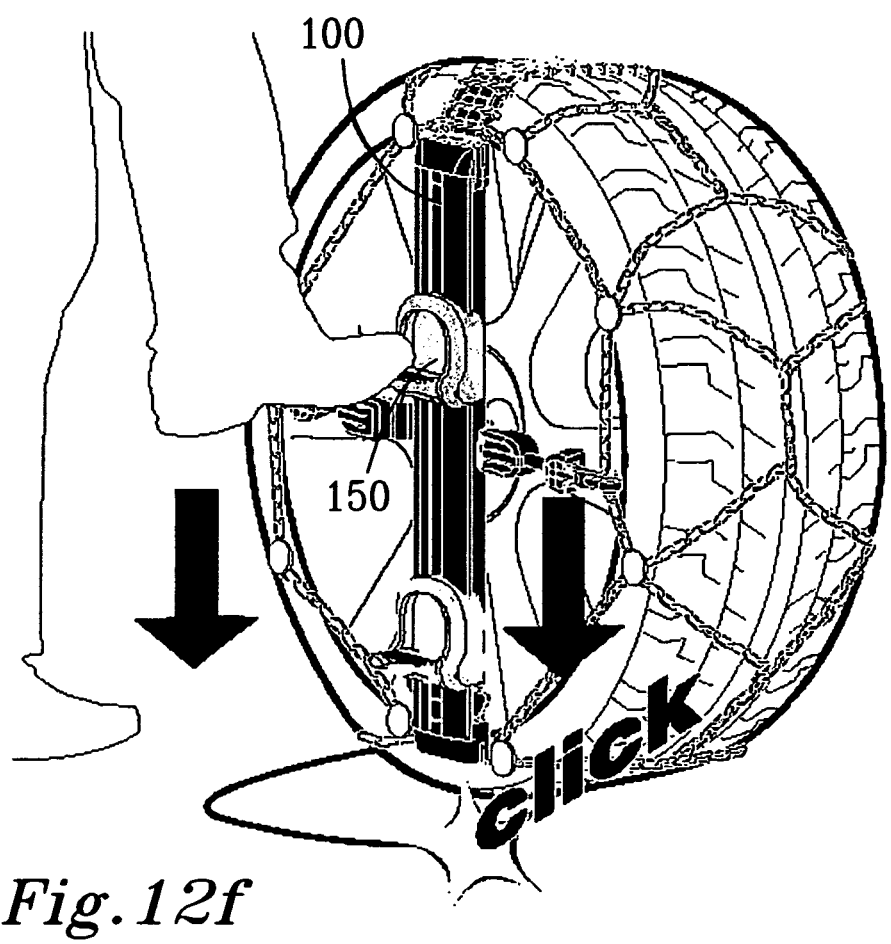
Figure 12G:
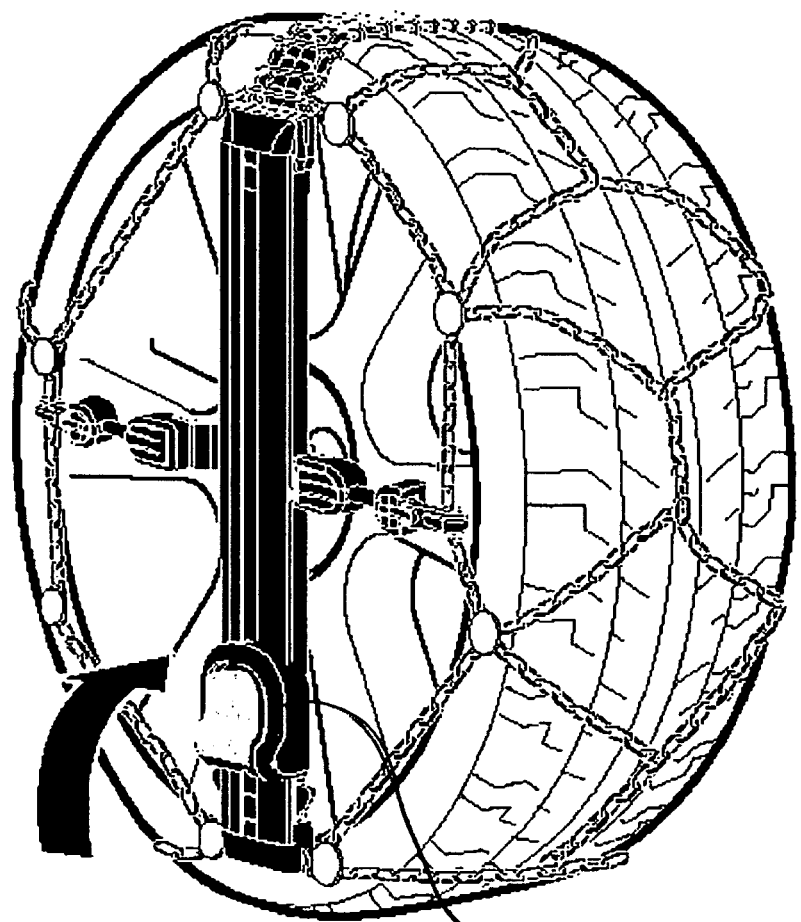

FIG. 12a-12j show how the anti slip device can be mounted and removed from a wheel. FIG. 12a-12j show in order of appearance; how a user bends the ring like member outwardly, thereby increasing the distance between the end points of the arc formed portions. The anti slip device can thereafter be mounted to the wheel, e.g. as described with respect to FIGS. 1-7 above and as shown in FIGS. 12b-12c. FIG. 12d shows the opposing side of the wheel 40 after the anti slip device has been mounted. FIG. 12e shows hoe the pivotable foot pad 150 is positioned in the operable position, i.e. ready to be stepped on by a user. FIG. 12f shows how a user operates the securing arrangement 100 by stepping on the foot pad 150 until the foot pad 150 is locked at the second position. FIG. 12g shows how the foot pad 150 is positioned in the transport position, at which the vehicle is ready to move e.g. a user can drive away with the vehicle.

Figure 12H:
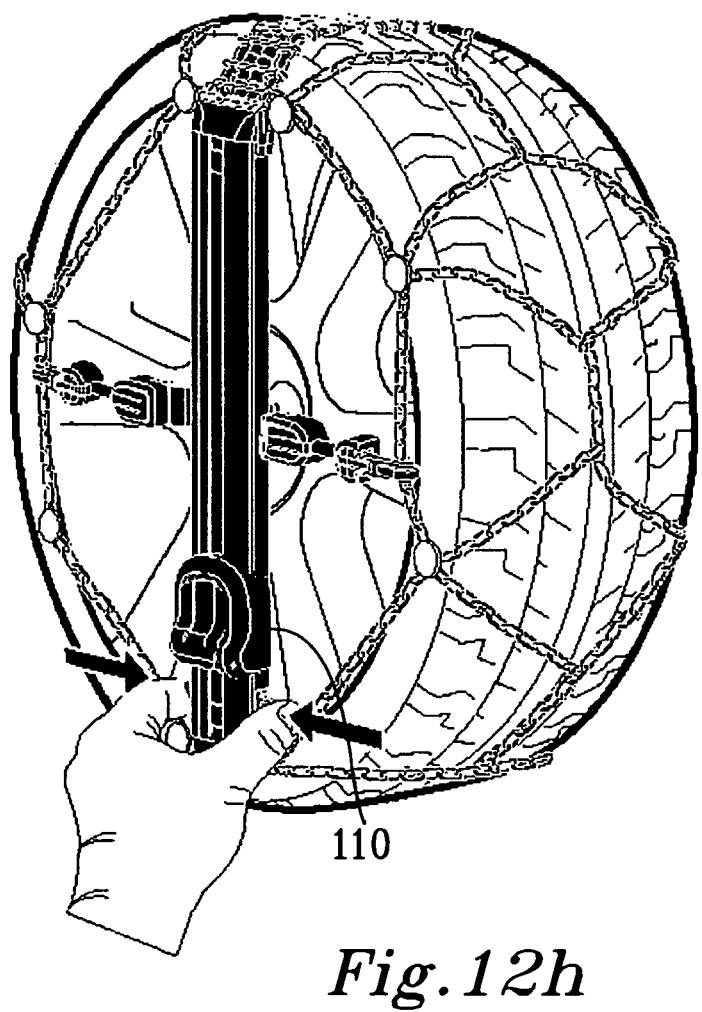
Figure 12I:
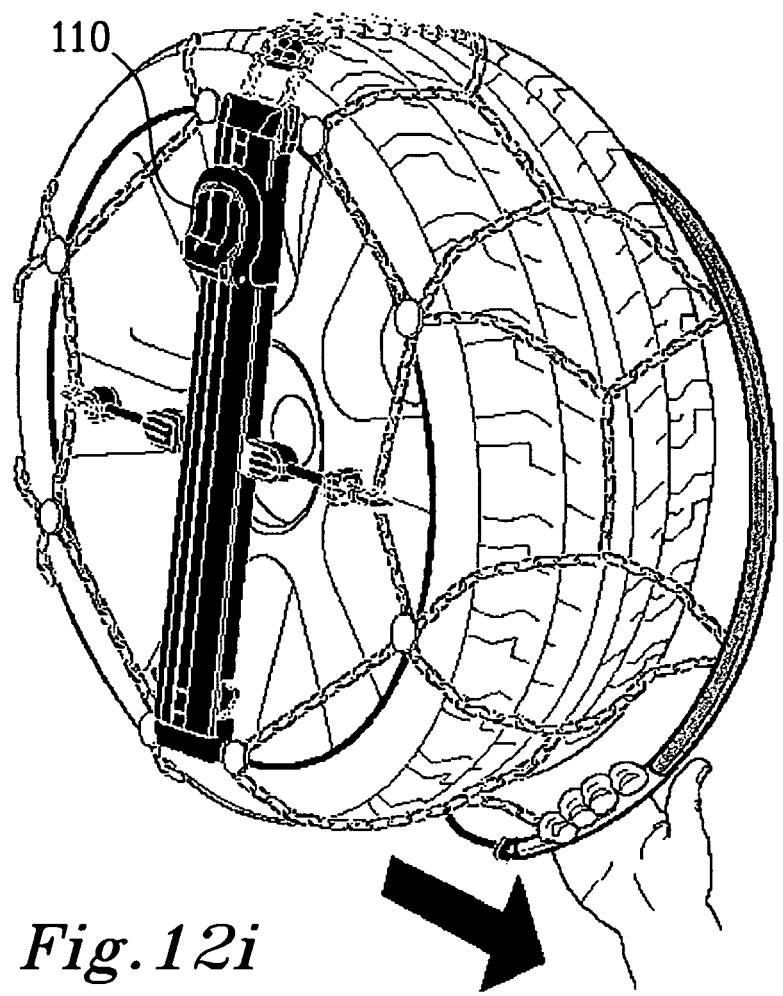
Figure 12J:
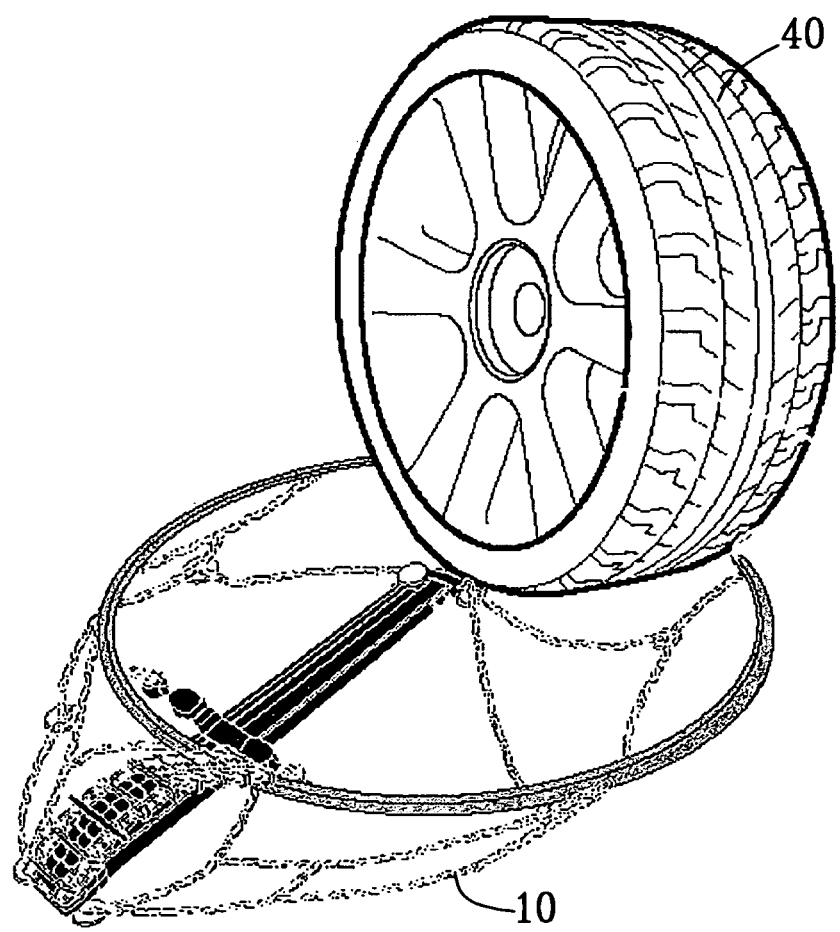

To remove the anti slip device 10 a user can release the imparted tension to the flexible elongated member (not shown) and the retraction member (not shown) by releasing the tensioning member 110. This is done by pressing at least one button 300 to release the tensioning member from snap lock as is shown in FIG. 12h. In FIG. 12i, the load, or tension, of the retraction member is removed as the retraction member is permitted to relax. The flexible elongated member is thus permitted to run substantially freely again and the first and second arc formed portions can be displaced. In FIG. 12j the anti slip device has been dismouonted from the wheel 40 and can be fully removed as soon as the wheel 40 has been removed from the anti slip device.

Figure 13A:
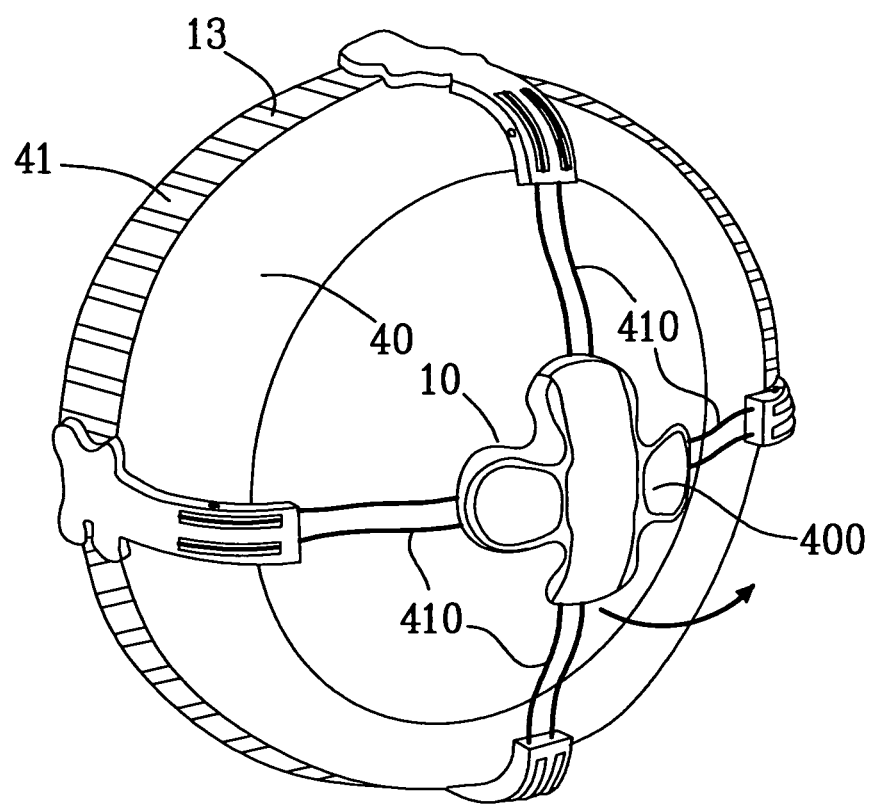
FIG. 13 shows the mounting, or fitting, of an alternative embodiment of an anti-slip device.
Figure 13B:
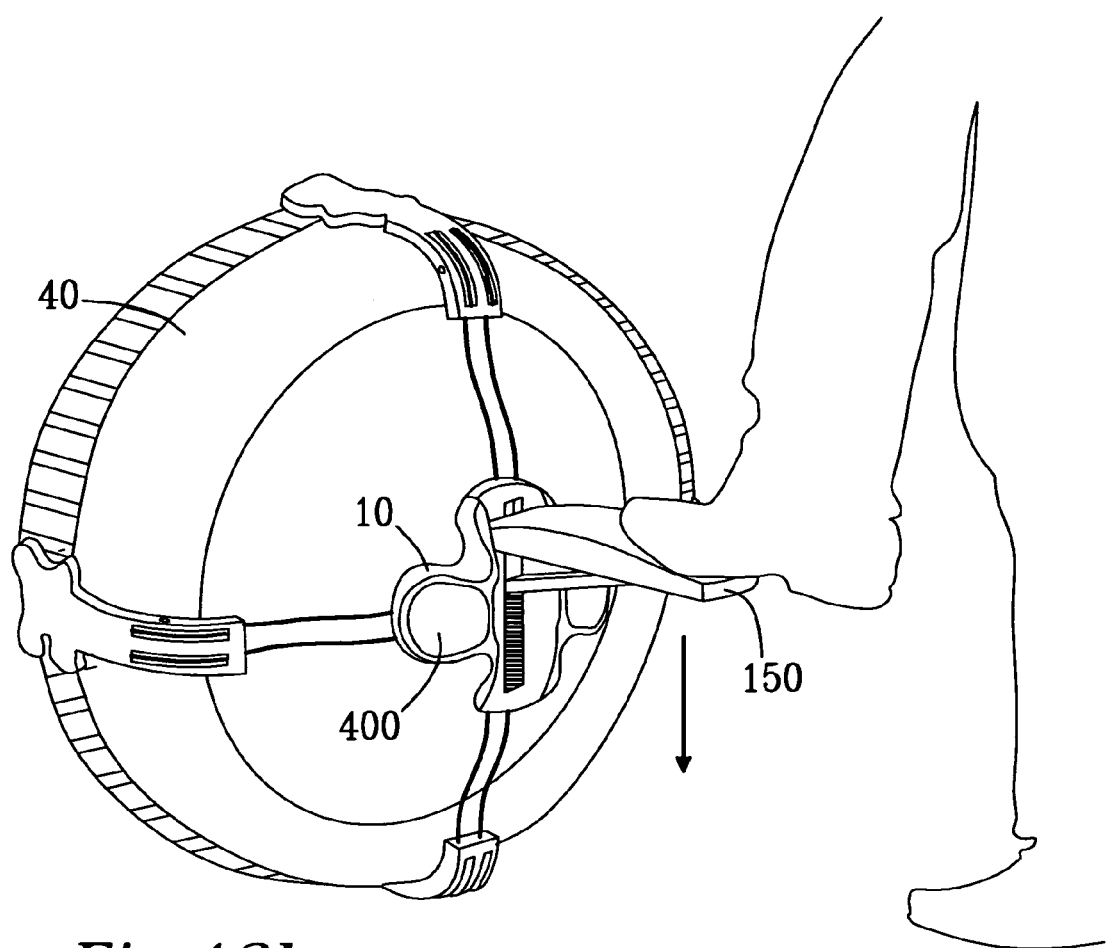
Figure 13C:
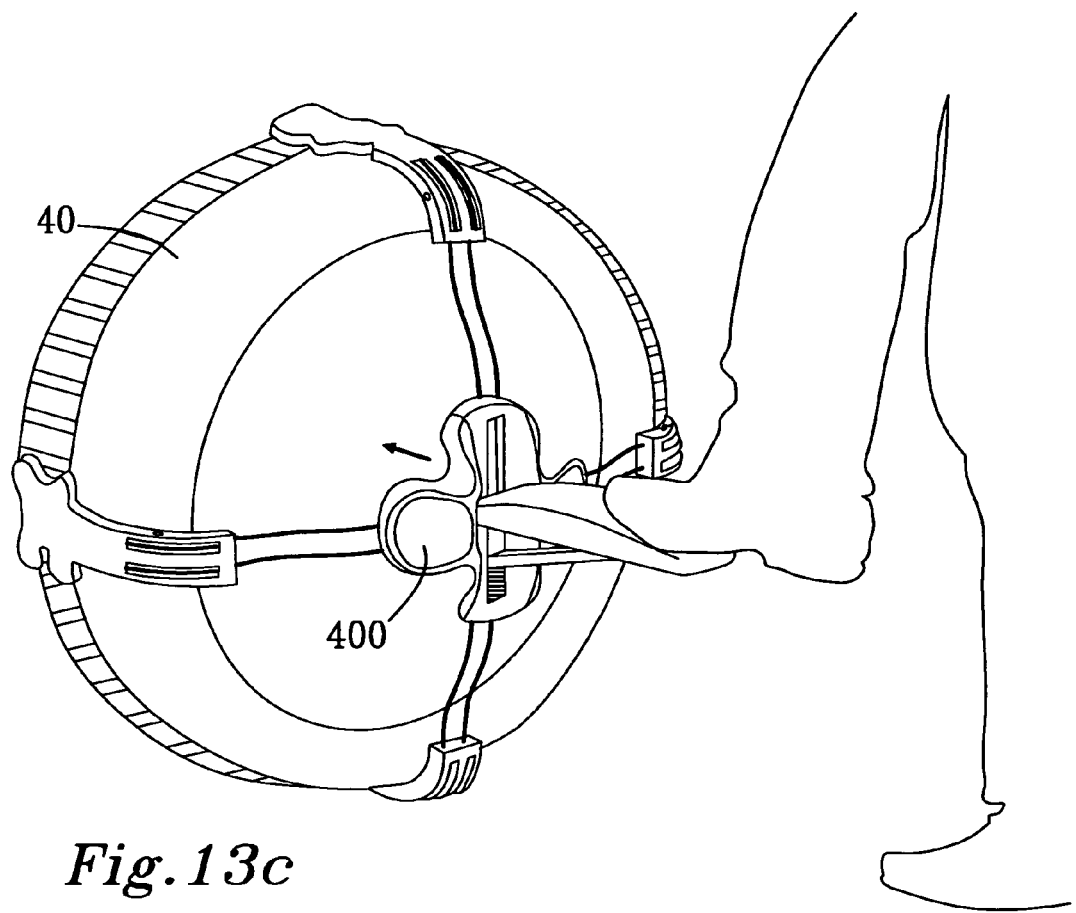

FIG. 13a-13c shows an alternative embodiment in which an anti slip device of a type described in EP 2050591 B1 in the name of Thule S.p.A. The anti slip device is arranged to the wheel 40 in a grip like manner and uses a hub 400 which is connected to the wheel, e.g. to a bolt of the wheel. The anti slip device can be fully mounted from the outside of the wheel 40, i.e. the wheel 40 does not need to be moved for the anti slip device to be mounted. A central hub 400 is configured to be disposed towards and to substantially coincide with the hub of the wheel 40 on which the anti slip device 10 is mounted on. A plurality of arms 410 protruding radially from the hub 400 and comprises terminal elements designed to be disposed on the tyre tread. Portions of chain connected to the terminal elements forms anti slip members 13, in this case so as to form a ring on the tyre tread 41. An adapter device (not shown) adapted to be fixed to a wheel-fixing bolt or nut carries a tensioning strap or chain which passes through the hub of the anti slip device 10 to be tensioned by the user. Upon tensioning, the hub 400 of the anti slip device moves towards the wheel 40 to lock the anti slip device to the wheel.

As can be seen in FIGS. 13a-13c, the foot pad 150 is displaced up and down to tension the tensioning strap, i.e. an flexible elongated element, and winds it up about a roll, as disclosed in EP 2050591B1.

The invention claimed is:

1. An anti slip device for a wheel having a first side, a second side and a tread, said anti slip device comprising:
   at least one anti slip member configured to provide said tread of said wheel with an anti slip surface;
   a securing arrangement securing said anti slip device to said wheel, said securing arrangement comprising a tensioning member configured to be operated by a user between a first position, in which said anti slip device can be removed from said wheel, and a second position, in which said anti slip device is substantially secured to said wheel;

wherein said tensioning member comprises a foot pad configured to be foot operated by said user, said foot pad containing at least one substantially planar surface, said securing arrangement comprises a rigid supporting unit, and said tensioning member comprises a slide section configured to slide on said rigid supporting unit between said first and second position, and said substantially planar surface is perpendicular to the remainder of the securing arrangement between said first position and said second position.

2. The anti slip device according to claim 1, wherein said securing arrangement comprises a housing, and said tensioning member is configured to be displaced with respect to said housing between said first and second position.

3. The anti slip device according to claim 2, wherein said housing is an elongated housing having a longitudinal axis, and said tensioning member is configured to be displaced substantially parallel with said longitudinal axis of said elongated housing.

4. The anti slip device according to claim 3, wherein said wheel comprises a rim and a tire and said elongated housing is configured to cooperate with parts of said rim or parts of said tire, when said tensioning member is displaced from said first position to said second position.

5. The anti slip device according to claim 1, wherein said anti slip device is configured to fit a wheel having a first diameter, and said housing has a first length, wherein said first length of said housing is at least 80% of said first diameter of said wheel.

6. The anti slip device according to claim 1, wherein said securing arrangement comprises a lock configured to lock said tensioning member in said second position.

7. The anti slip device according to claim 1, wherein said foot pad is arranged substantially perpendicular to said wheel when said foot pad is in said operable position and after said anti slip device has been mounted to said wheel.

8. The anti slip device according to claim 1, wherein said securing arrangement comprises at least one retraction member, the at least one retraction member configured to impart a flexible elongated member with a force component acting to tighten said flexible elongated member when said tensioning member has been displaced to said second position.

9. The anti slip device according to claim 1, wherein said securing arrangement comprises a housing and said tensioning member comprises a first and a second section, said first section being arranged inside of said housing and engaged with a retraction member, and said second section being arranged outside of said housing.

10. The anti slip device according to claim 1, wherein said tensioning member of said securing arrangement is in working cooperation with a flexible elongated member, and wherein when said tensioning member is displaced from said first position to said second position, said flexible elongated member secures said anti slip device to said wheel.

11. The anti slip device according to claim 10, wherein when said tensioning member is displaced from said second position to said first position, said flexible elongated member is at least partly relieved from stress, thereby permitting removal of said anti slip device from said wheel.

12. A method for attaching an anti slip device according to claim 1 to a wheel of a vehicle, the method comprising:
   mounting said anti slip device to said wheel; and
   imparting said tensioning member with a force component using a foot to displace said tensioning member from said first position to said second position,
   wherein said tensioning member is slid on said rigid supporting unit.

13. An anti slip device for a wheel having a first side, a second side and a tread, said anti slip device comprising:
   at least one anti slip member configured to provide said tread of said wheel with an anti slip surface;
   a securing arrangement securing said anti slip device to said wheel, said securing arrangement comprising a tensioning member configured to be operated by a user between a first position, in which said anti slip device can be removed from said wheel, and a second position, in which said anti slip device is substantially secured to said wheel;
   wherein said securing arrangement comprises a housing, and said tensioning member comprises a foot pad configured to be displaced with respect to said housing between said first and second position, said foot pad containing at least one substantially planar surface wherein said substantially planar surface is perpendicular to the remainder of the securing arrangement between said first position and said second position, and
   said housing is an elongated housing having a longitudinal axis, and said tensioning member is configured to be displaced substantially parallel with said longitudinal axis of said elongated housing.

14. The anti slip device according to claim 13, wherein said anti slip device is configured to fit a wheel having a first diameter, and said housing has a first length, wherein said first length of said housing is at least 80% of said first diameter of said wheel.

15. The anti slip device according to claim 13, wherein said securing arrangement comprises a lock configured to lock said tensioning member in said second position.

16. The anti slip device according to claim 13, wherein said wheel comprises a rim and a tire and said elongated housing is configured to cooperate with parts of said rim or parts of said tire, when said tensioning member is displaced from said first position to said second position.

17. The anti slip device according to claim 13, wherein said tensioning member comprises a foot pad.

18. The anti slip device according to claim 17, wherein said foot pad is arranged substantially perpendicular to said wheel when said foot pad is in said operable position and after said anti slip device has been mounted to said wheel.

19. The anti slip device according to claim 13, wherein said securing arrangement comprises at least one retraction member, the at least one retraction member configured to impart a flexible elongated member with a force component acting to tighten said flexible elongated member when said tensioning member has been displaced to said second position.

* * * * *